United States Patent
Bostic et al.

(10) Patent No.: US 10,262,050 B2
(45) Date of Patent: Apr. 16, 2019

(54) DISTRIBUTED DATABASE SYSTEMS AND METHODS WITH PLUGGABLE STORAGE ENGINES

(71) Applicant: MongoDB, Inc., New York, NY (US)

(72) Inventors: Keith Bostic, Lincoln, MA (US);
Michael Cahill, Summer Hill (AU);
Eliot Horowitz, New York, NY (US);
Dan Pasette, Brooklyn, NY (US);
Mathias Stearn, New York, NY (US);
Geert Bosch, Brooklyn, NY (US)

(73) Assignee: MongoDB, Inc., New York, NY (US)

( * ) Notice: Subject to any disclaimer, the term of this patent is extended or adjusted under 35 U.S.C. 154(b) by 324 days.

(21) Appl. No.: 14/992,225

(22) Filed: Jan. 11, 2016

(65) Prior Publication Data

US 2017/0091327 A1    Mar. 30, 2017

Related U.S. Application Data

(60) Provisional application No. 62/232,979, filed on Sep. 25, 2015.

(51) Int. Cl.
*G06F 7/00* (2006.01)
*G06F 17/00* (2006.01)
*G06F 17/30* (2006.01)

(52) U.S. Cl.
CPC .... *G06F 17/30569* (2013.01); *G06F 17/3056* (2013.01); *G06F 17/30336* (2013.01); *G06F 17/30545* (2013.01); *G06F 17/30864* (2013.01)

(58) Field of Classification Search
CPC ......... G06F 17/30545; G06F 17/30569; G06F 17/30864; G06F 17/30312; G06N 5/04
See application file for complete search history.

(56) References Cited

U.S. PATENT DOCUMENTS

| 4,918,593 A | 4/1990 | Huber |
| 5,379,419 A | 1/1995 | Heffernan et al. |
| 5,416,917 A * | 5/1995 | Adair ............... G06F 17/30569 707/695 |
| 5,471,629 A | 11/1995 | Risch |

(Continued)

OTHER PUBLICATIONS

[No Author Listed], Automated Administration Tasks (SQL Server Agent). https://docs.microsoft.com/en-us/sql/ssms/agent/automated-adminsitration-tasks-sql-server-agent. 2 pages. [downloaded Mar. 4, 2017].
Chang et al., Bigtable: a distributed storage system for structured data. OSDI'06: Seventh Symposium on Operating System Design and Implementation. Nov. 2006.
Cooper et al., PNUTS: Yahoo!'s hosted data serving platform. VLDB Endowment. Aug. 2008.

(Continued)

*Primary Examiner* — Hasanul Mobin
(74) *Attorney, Agent, or Firm* — Wolf, Greenfield & Sacks, P.C.

(57) ABSTRACT

According to one aspect, methods and systems are provided for selectively employing storage engines in a distributed database environment. The methods and systems can include a processor configured to execute a plurality of system components, wherein the system components comprise an operation prediction component configured to determine an expected set of operations to be performed on a portion of the database; a data format selection component configured to select, based on at least one characteristic of the expected set of operations, a data format for the portion of the database; and at least one storage engine for writing the portion of the database in the selected data format.

20 Claims, 10 Drawing Sheets

(56) References Cited

U.S. PATENT DOCUMENTS

| | | |
|---|---|---|
| 5,551,027 A | 8/1996 | Choy et al. |
| 5,598,559 A | 1/1997 | Chaudhuri |
| 5,710,915 A | 1/1998 | McElhiney |
| 5,884,299 A | 3/1999 | Ramesh et al. |
| 5,999,179 A | 12/1999 | Kekic et al. |
| 6,065,017 A | 5/2000 | Barker |
| 6,115,705 A | 9/2000 | Larson |
| 6,240,406 B1 | 5/2001 | Tannen |
| 6,324,540 B1 | 11/2001 | Khanna et al. |
| 6,324,654 B1 | 11/2001 | Wahl et al. |
| 6,339,770 B1 | 1/2002 | Leung et al. |
| 6,351,742 B1 | 2/2002 | Agarwal et al. |
| 6,363,389 B1 | 3/2002 | Lyle et al. |
| 6,385,201 B1 | 5/2002 | Iwata |
| 6,385,604 B1 | 5/2002 | Bakalash et al. |
| 6,505,187 B1 | 1/2003 | Shatdal |
| 6,687,846 B1 | 2/2004 | Adrangi et al. |
| 6,691,101 B2 | 2/2004 | MacNicol et al. |
| 6,823,474 B2 | 11/2004 | Kampe et al. |
| 7,020,649 B2 | 3/2006 | Cochrane et al. |
| 7,032,089 B1 | 4/2006 | Ranade et al. |
| 7,082,473 B1 | 7/2006 | Breitbart et al. |
| 7,177,866 B2 | 2/2007 | Holenstein et al. |
| 7,181,460 B2 | 2/2007 | Coss et al. |
| 7,191,299 B1 | 3/2007 | Kekre et al. |
| 7,246,345 B1 | 7/2007 | Sharma et al. |
| 7,467,103 B1 | 12/2008 | Murray et al. |
| 7,472,117 B2 | 12/2008 | Dettinger et al. |
| 7,486,661 B2 | 2/2009 | Van den Boeck et al. |
| 7,548,928 B1 | 6/2009 | Dean et al. |
| 7,558,481 B2 | 7/2009 | Jenkins et al. |
| 7,567,991 B2 | 7/2009 | Armangau et al. |
| 7,617,369 B1 | 11/2009 | Bezbaruah et al. |
| 7,634,459 B1 | 12/2009 | Eshet et al. |
| 7,647,329 B1 | 1/2010 | Fischman et al. |
| 7,657,570 B2 | 2/2010 | Wang et al. |
| 7,668,801 B1 | 2/2010 | Koudas et al. |
| 7,957,284 B2 | 6/2011 | Lu et al. |
| 7,962,458 B2 | 6/2011 | Holenstein et al. |
| 8,005,868 B2 | 8/2011 | Saborit et al. |
| 8,037,059 B2 | 10/2011 | Bestgen et al. |
| 8,082,265 B2 | 12/2011 | Carlson et al. |
| 8,086,597 B2 | 12/2011 | Balmin et al. |
| 8,108,443 B2 | 1/2012 | Thusoo |
| 8,126,848 B2 | 2/2012 | Wagner |
| 8,170,984 B2 | 5/2012 | Bakalash et al. |
| 8,260,840 B1 | 9/2012 | Sirota et al. |
| 8,296,419 B1 | 10/2012 | Khanna et al. |
| 8,321,558 B1 | 11/2012 | Sirota et al. |
| 8,352,463 B2 | 1/2013 | Nayak |
| 8,363,961 B1 | 1/2013 | Avidan et al. |
| 8,386,463 B2 | 2/2013 | Bestgen et al. |
| 8,392,482 B1 | 3/2013 | McAlister et al. |
| 8,572,031 B2 * | 10/2013 | Merriman ......... G06F 17/30578 707/613 |
| 8,589,382 B2 | 11/2013 | Betawadkar-Norwood |
| 8,589,574 B1 | 11/2013 | Cormie et al. |
| 8,615,507 B2 | 12/2013 | Varadarajulu et al. |
| 8,712,993 B1 | 4/2014 | Ordonez |
| 8,751,533 B1 * | 6/2014 | Dhavale ................ G06F 3/0647 707/782 |
| 8,843,441 B1 | 9/2014 | Rath et al. |
| 8,996,463 B2 | 3/2015 | Merriman et al. |
| 9,015,431 B2 | 4/2015 | Resch et al. |
| 9,069,827 B1 * | 6/2015 | Rath .................. G06F 17/30557 |
| 9,183,254 B1 | 11/2015 | Cole et al. |
| 9,262,462 B2 | 2/2016 | Merriman et al. |
| 9,317,576 B2 | 4/2016 | Merriman et al. |
| 9,350,633 B2 | 5/2016 | Cudak et al. |
| 9,460,008 B1 * | 10/2016 | Leshinsky ......... G06F 17/30185 |
| 9,740,762 B2 | 8/2017 | Horowitz et al. |
| 9,792,322 B2 | 10/2017 | Merriman et al. |
| 9,805,108 B2 | 10/2017 | Merriman et al. |
| 9,881,034 B2 | 1/2018 | Horowitz et al. |
| 10,031,931 B2 | 7/2018 | Horowitz et al. |
| 10,031,956 B2 | 7/2018 | Merriman et al. |
| 2002/0147842 A1 | 10/2002 | Breitbart et al. |
| 2003/0088659 A1 | 5/2003 | Susarla et al. |
| 2003/0182427 A1 | 9/2003 | Halpern |
| 2003/0187864 A1 | 10/2003 | McGoveran |
| 2004/0168084 A1 | 8/2004 | Owen et al. |
| 2004/0186817 A1 | 9/2004 | Thames et al. |
| 2004/0205048 A1 | 10/2004 | Pizzo et al. |
| 2004/0236743 A1 | 11/2004 | Blaicher et al. |
| 2004/0254919 A1 * | 12/2004 | Giuseppini ....... G06F 17/30964 |
| 2005/0033756 A1 * | 2/2005 | Kottomtharayil ..... G06F 3/0617 |
| 2005/0038833 A1 | 2/2005 | Colrain et al. |
| 2005/0192921 A1 | 9/2005 | Chaudhuri et al. |
| 2006/0004746 A1 * | 1/2006 | Angus .............. G06F 17/30563 |
| 2006/0085541 A1 | 4/2006 | Cuomo et al. |
| 2006/0168154 A1 | 7/2006 | Zhang et al. |
| 2006/0209782 A1 | 9/2006 | Miller et al. |
| 2006/0235905 A1 | 10/2006 | Kapur |
| 2007/0094237 A1 | 4/2007 | Mitchell et al. |
| 2007/0233746 A1 | 10/2007 | Garbow et al. |
| 2008/0002741 A1 | 1/2008 | Maheshwari et al. |
| 2008/0140971 A1 | 6/2008 | Dankel et al. |
| 2008/0162590 A1 | 7/2008 | Kundu et al. |
| 2008/0288646 A1 | 11/2008 | Hasha et al. |
| 2009/0055350 A1 | 2/2009 | Branish et al. |
| 2009/0094318 A1 * | 4/2009 | Gladwin ............. H04L 67/1097 709/203 |
| 2009/0222474 A1 | 9/2009 | Alpern et al. |
| 2009/0240744 A1 | 9/2009 | Thomson et al. |
| 2009/0271412 A1 | 10/2009 | Lacapra et al. |
| 2010/0030793 A1 | 2/2010 | Cooper et al. |
| 2010/0030800 A1 | 2/2010 | Brodfuehrer et al. |
| 2010/0106934 A1 | 4/2010 | Calder et al. |
| 2010/0198791 A1 | 8/2010 | Wu et al. |
| 2010/0205028 A1 | 8/2010 | Johnson et al. |
| 2011/0202792 A1 | 8/2011 | Atzmony |
| 2011/0225122 A1 | 9/2011 | Denuit et al. |
| 2011/0225123 A1 * | 9/2011 | D'Souza ........... G06F 17/30312 707/634 |
| 2011/0231447 A1 | 9/2011 | Starkey |
| 2011/0246717 A1 * | 10/2011 | Kobayashi .......... G06F 11/1096 711/114 |
| 2012/0076058 A1 | 3/2012 | Padmanabh et al. |
| 2012/0078848 A1 | 3/2012 | Jennas et al. |
| 2012/0084414 A1 | 4/2012 | Brock et al. |
| 2012/0109892 A1 | 5/2012 | Novik et al. |
| 2012/0159097 A1 * | 6/2012 | Jennas, II ............. G06F 3/0611 711/162 |
| 2012/0166390 A1 | 6/2012 | Merriman et al. |
| 2012/0198200 A1 | 8/2012 | Li et al. |
| 2012/0254175 A1 | 10/2012 | Horowitz et al. |
| 2012/0274664 A1 | 11/2012 | Fagnou |
| 2012/0320914 A1 | 12/2012 | Thyni et al. |
| 2013/0290249 A1 | 10/2013 | Merriman et al. |
| 2013/0290471 A1 | 10/2013 | Venkatesh |
| 2013/0332484 A1 | 12/2013 | Gajic |
| 2013/0339379 A1 | 12/2013 | Ferrari et al. |
| 2014/0013334 A1 * | 1/2014 | Bisdikian ............ G06F 11/0709 719/313 |
| 2014/0032525 A1 | 1/2014 | Merriman et al. |
| 2014/0032579 A1 | 1/2014 | Merriman et al. |
| 2014/0032628 A1 | 1/2014 | Cudak et al. |
| 2014/0164831 A1 | 6/2014 | Merriman et al. |
| 2014/0279929 A1 * | 9/2014 | Gupta ................. G06F 11/1471 707/683 |
| 2015/0074041 A1 * | 3/2015 | Bhattacharjee ... G06F 17/30448 707/607 |
| 2015/0242531 A1 * | 8/2015 | Rodniansky ...... G06F 17/30917 707/782 |
| 2015/0278295 A1 | 10/2015 | Merriman et al. |
| 2016/0203202 A1 | 7/2016 | Merriman et al. |
| 2016/0246861 A1 | 8/2016 | Merriman et al. |
| 2017/0032007 A1 | 2/2017 | Merriman |
| 2017/0032010 A1 | 2/2017 | Merriman |
| 2017/0109398 A1 | 4/2017 | Stearn |
| 2017/0109399 A1 | 4/2017 | Stearn et al. |

(56) References Cited

U.S. PATENT DOCUMENTS

| | | |
|---|---|---|
| 2017/0109421 A1 | 4/2017 | Stearn et al. |
| 2017/0169059 A1 | 6/2017 | Horowitz et al. |
| 2017/0262516 A1 | 9/2017 | Horowitz et al. |
| 2017/0262517 A1 | 9/2017 | Horowitz et al. |
| 2017/0262519 A1 | 9/2017 | Horowitz et al. |
| 2017/0262638 A1 | 9/2017 | Horowitz et al. |
| 2017/0264432 A1 | 9/2017 | Horowitz et al. |
| 2017/0270176 A1 | 9/2017 | Horowitz et al. |
| 2017/0286510 A1 | 10/2017 | Horowitz et al. |
| 2017/0286516 A1 | 10/2017 | Horowitz et al. |
| 2017/0286517 A1 | 10/2017 | Horowitz et al. |
| 2017/0286518 A1 | 10/2017 | Horowitz et al. |
| 2017/0322954 A1 | 11/2017 | Horowitz et al. |
| 2017/0322996 A1 | 11/2017 | Horowitz et al. |
| 2017/0344290 A1 | 11/2017 | Horowitz et al. |
| 2017/0344441 A1 | 11/2017 | Horowitz et al. |
| 2017/0344618 A1 | 11/2017 | Horowitz et al. |
| 2017/0371750 A1 | 12/2017 | Horowitz et al. |
| 2017/0371968 A1 | 12/2017 | Horowitz et al. |
| 2018/0004804 A1 | 1/2018 | Merriman et al. |
| 2018/0096045 A1 | 4/2018 | Merriman et al. |

OTHER PUBLICATIONS

Decandia et al., Dynamo: Amazon's highly available key-value store. SOSP 2007. Oct. 2004.
Nelson et al., Automate MongoDB with MMS. PowerPoint Presentation. Published Jul. 24, 2014. 27 slides. http://www.slideshare.net/mongodb/mms-automation-mongo-db-world.
Poder, Oracle living books. 2009. <http://tech.e2sn.com/oracle/sql/oracle-execution-plan-operation-reference >.
Stirman, Run MongoDB with Confidence using MMS. PowerPoint Presentation. Published Oct. 6, 2014. 34 slides. http://www.slideshare.net/mongodb/mongo-db-boston-run-mongodb-with-mms-20141001.
Van Renesse et al., Chain replication for supporting high throughput and availability. OSDI. 2004: 91-104.
Walsh et al., Xproc: An XML Pipeline Language. May 11, 2011. <https://www.w3.org/TR/xproc/>.
Wikipedia, Dataflow programming. Oct. 2011. <http://en.wikipedia.org/wiki/Dataflow_programming>.
Wikipedia, Pipeline (Unix). Sep. 2011. <http://en.wikipedia.org/wild/Pipeline (Unix)>.
Wilkins et al., Migrate DB2 applications to a partitioned database. developerWorks, IBM. Apr. 24, 2008, 33 pages.

* cited by examiner

DISTRIBUTED DATABASE SYSTEMS AND METHODS WITH PLUGGABLE STORAGE ENGINES

RELATED APPLICATIONS

This application claims priority under 35 U.S.C. § 119(e) to U.S. Provisional App. No. 62/232,979, entitled "DISTRIBUTED DATABASE SYSTEMS AND METHODS WITH PLUGGABLE STORAGE ENGINES," filed Sep. 25, 2015, which application is incorporated herein by reference in its entirety.

BACKGROUND

Technical Field

The present invention relates to distributed database systems and methods for selectively employing storage engines.

Background Discussion

Multiple data storage formats exist for storing data in a database. Storage engines exist that are capable of storing data in a particular data format. Applications, system processes, and other programs that access the data instruct the storage engine to perform a database operation, causing the storage engine to interact with the data in the expected data format.

SUMMARY

Conventional approaches to database storage are typically tied to a particular data format and, in some approaches, a storage engine capable of managing that data format. While the format may be changed with some effort, conventional approaches require significant time and involve complexity that makes such changes difficult, at best. For example, modifications to the data format and/or the storage engine may need to comply with forward- and backward-compatibility requirements. The inefficiency of being tied to a particular format is exacerbated by the advent of "big data" and ever-larger databases. More efficient storage and retrieval of the information stored in databases is increasingly important. While a number of storage formats have been employed in storing database data, the selection of a particular format has largely been dependent on intuition and guesswork of the user and/or the application software developer. Furthermore, adding or modifying storage functionality in a particular storage format has typically required changes to the high-level database code in user applications and system routines. Scaling a database up in size has similarly presented issues, as the database read/write operations coded in an application may be tailored to a data format that is no longer optimal.

There is therefore a need for a database that can store data in the optimal data format in a particular situation without requiring changes to the applications or processes accessing that data. Accordingly, methods and systems are provided by which a storage application programming interface (API) is employed as a level of abstraction in database read/write operations. A database application may simply instruct the storage API to "write" a portion of a database, and the database engine selects an appropriate storage engine based on automated optimization analysis, user preference, or other factors. In some embodiments, the database application may request that data be stored by a particular storage engine, or stored in a particular format. The database engine may fulfill the request, and may also cause the data to be stored in a different format determined to be optimal.

In some embodiments, storage engines may be modular and "pluggable," allowing for modification, removal, or addition of storage engines without changing the application code. In further embodiments, the storage engine may determine to store the data in one or more data formats, including an optimal format that the storage engine determines. In this manner, operation requests received by the database may be carried out such that different portions of the database may be stored by different storage engines in different formats, enabling optimization of storage operations at various levels in a database (e.g., entire database, partitions, logical groupings, and any base unit of storage). Optimization decisions can be made at each step as the level of granularity increases from the database engine to the storage engine to the particular data format. For example, a "write" request received by the database may cause the database engine to select a particular storage engine to carry out the request; the storage engine may then determine an optimal format in which to store the data.

A storage API interacting with a database engine capable of calling pluggable storage engines in such a manner offers a number of benefits. For example, application code is simplified. Fewer modifications may be required to switch between engines, because the storage API is opaque to the user, who need not be concerned with format-specific operations underlying "write" operations or other access requests. The same query language, data model, scaling considerations, security protocols, and operational tooling may be used no matter the underlying data format.

Further, a database engine calling pluggable storage engines offers benefits to database systems employing replica sets having a primary node and one or more replica secondary nodes. A storage API allows such replica sets to be easily managed with minimal code, as the storage API allows a user to simultaneously write to a primary node in one format, and to a replica node in another format, without regard to the respective data formats. This approach allows live migration between different storage engines and/or data formats, thereby reducing the complexity and time required for conventional approaches.

In addition, the database engine underlying the storage API may be configured to automatically select a storage engine (i.e., data format), allowing for dynamic changes to the format of a particular set of data based on historic and/or expected data operations and volume, data structure and characteristics, and other factors. Any change in data format can be monitored, and a comparison can made between the performance and efficiency observed in the previous and current data format. Based on that comparison, any necessary adjustments can be made. In some embodiments, the previous and current data format may be maintained in parallel for some amount of time, to allow for a comparison and selection of an optimal format.

According to one aspect of the present invention, a database system is provided comprising at least one processor configured to execute a plurality of system components, wherein the system components comprise an operation prediction component configured to determine an expected set of operations to be performed on a portion of the database, a data format selection component configured to select, based on at least one characteristic of the expected set of operations, a data format for the portion of the database, and at least one storage engine for writing the portion of the database in the selected data format. According to one embodiment, the operation prediction component is further configured to access information about a past set of operations for a first time period, and predict, based on the past set of operations for the first time period, an expected set of operations to be performed on the portion of the database during a second time period. According to one embodiment, the operation prediction component is further configured to determine the expected set of operations to be performed on the portion of the database by identifying a data structure for data to be stored in the portion of the database. According to one embodiment, the characteristic of the expected set of operations is a relatively high ratio of read operations to write operations. According to another embodiment, the data format is a row-store format.

According to one embodiment, the data format is a column-store format. According to one embodiment, the characteristic of the expected set of operations is a determination that sequential operations are likely to be performed on a first storage location and a second storage location nearby the first storage location. According to one embodiment, the characteristic of the expected set of operations is a relatively high ratio of write operations to read operations. According to one embodiment, the data format is a log-sequence merge format. According to another embodiment, the characteristic of the expected set of operations is a requirement to update less than all of the fields in a plurality of records stored in the database, and wherein the data format is a column-store format.

According to another aspect of the present invention, a method of performing operations in a computer database is provided comprising steps of determining, by a computer system, an expected set of operations to be performed on a portion of a database, selecting, based on at least one characteristic of the expected set of operations, a data format for the portion of the database, storing the selected data format in a configuration metadata component of the computer database, and writing data to the portion of the database in the selected data format. According to one embodiment, determining the expected set of operations to be performed on the portion of the database comprises accessing information about a past set of operations for a first time period, and predicting, based on the past set of operations for the first time period, an expected set of operations to be performed on the portion of the database during a second time period. According to another embodiment, determining the expected set of operations to be performed on the portion of the database comprises identifying a data structure for data to be stored in the portion of the database.

According to one embodiment, the characteristic of the expected set of operations is a relatively high ratio of read operations to write operations. According to one embodiment, the first data format is a row-store format. According to one embodiment, the first data format is a column-store format. According to one embodiment, the characteristic of the expected set of operations is a determination that sequential operations are likely to be performed on a first storage location and a second storage location nearby the first storage location. According to one embodiment, the characteristic of the expected set of operations is a relatively high ratio of write operations to read operations. According to another embodiment, the second data format is a log-sequence merge format. According to yet another embodiment, the first characteristic of the expected set of operations is a requirement to update less than all of the fields in a plurality of records stored in the database, and wherein the first data format is a column-store format.

According to another aspect of the present invention, a method of performing operations in a computer database is provided comprising steps of presenting, in a user interface of a computer system, a plurality of data format options for a portion of a database, receiving, from the user interface, a user selection of a data format for the portion of the database, storing the data format selection as configuration metadata for the database, responsive to the data format selection indicating a first data format, activating a first storage engine to store the portion of the database in the first data format, and responsive to the data format selection indicating a second data format, activating a second storage engine to store the portion of the database in the second data format. According to one embodiment, the first data format is a row-store format. According to one embodiment, the first data format is a column-store format. According to another embodiment, the second data format is a log-sequence merge format.

According to one aspect of the present invention, a method of performing operations in a computer database, comprising steps of receiving, from a computer application, a request to perform a write operation, wherein the request does not specify a data storage format, selecting, by a computer system, a data storage format from a group consisting of at least a first data storage format and a second data storage format, responsive to a selection of the first data storage format, performing the write operation using a first data storage engine, and responsive to a selection of the second data storage format, performing the write operation using a second data storage engine. According to another aspect, a database system for storing data in an optimal format is provided comprising an application programming interface configured to receive, from a computer system, a request to perform a write operation, wherein the request does not specify a data storage format, at least one storage component configured to store a plurality of data records, a first storage engine configured to store the plurality of data records in a first format, a second storage engine configured to store the plurality of data records in a second format, and a storage engine selector for selectively executing one of the first storage engine or the second storage engine to perform the write operation. According to one embodiment, system further comprises a database monitor configured to track performance information about the database system, and a memory configured to store analytics data comprising performance information tracked by the database monitor. According to another embodiment, the system further comprises a configuration database adapted to stored configuration metadata about the database, the configuration metadata including at least one of an association between a storage engine and one of the at least one storage components.

According to another aspect of the present invention, a database system for storing data in an optimal format is provided comprising an application programming interface configured to receive, from a computer system, a request to perform a write operation, wherein the request does not specify a data storage format, a replica set comprising a primary node having a first storage component and a secondary node having a second storage component, the first storage component and the second storage component configured to store a plurality of records, a first storage engine configured to store the plurality of data records in a first format in the first storage component, and a second storage engine configured to store the plurality of data records in a second format in the second storage component. According to one embodiment, the system further comprises a storage engine selector for selectively executing one of the first storage engine or the second storage engine to perform the write operation.

BRIEF DESCRIPTION OF THE DRAWINGS

Various aspects of at least one embodiment are discussed herein with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. Where technical features in the figures, detailed description or any claim are followed by reference signs, the reference signs have been included for the sole purpose of increasing the intelligibility of the figures, detailed description, and/or claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure.

In the figures.

DETAILED DESCRIPTION

Figure 1:
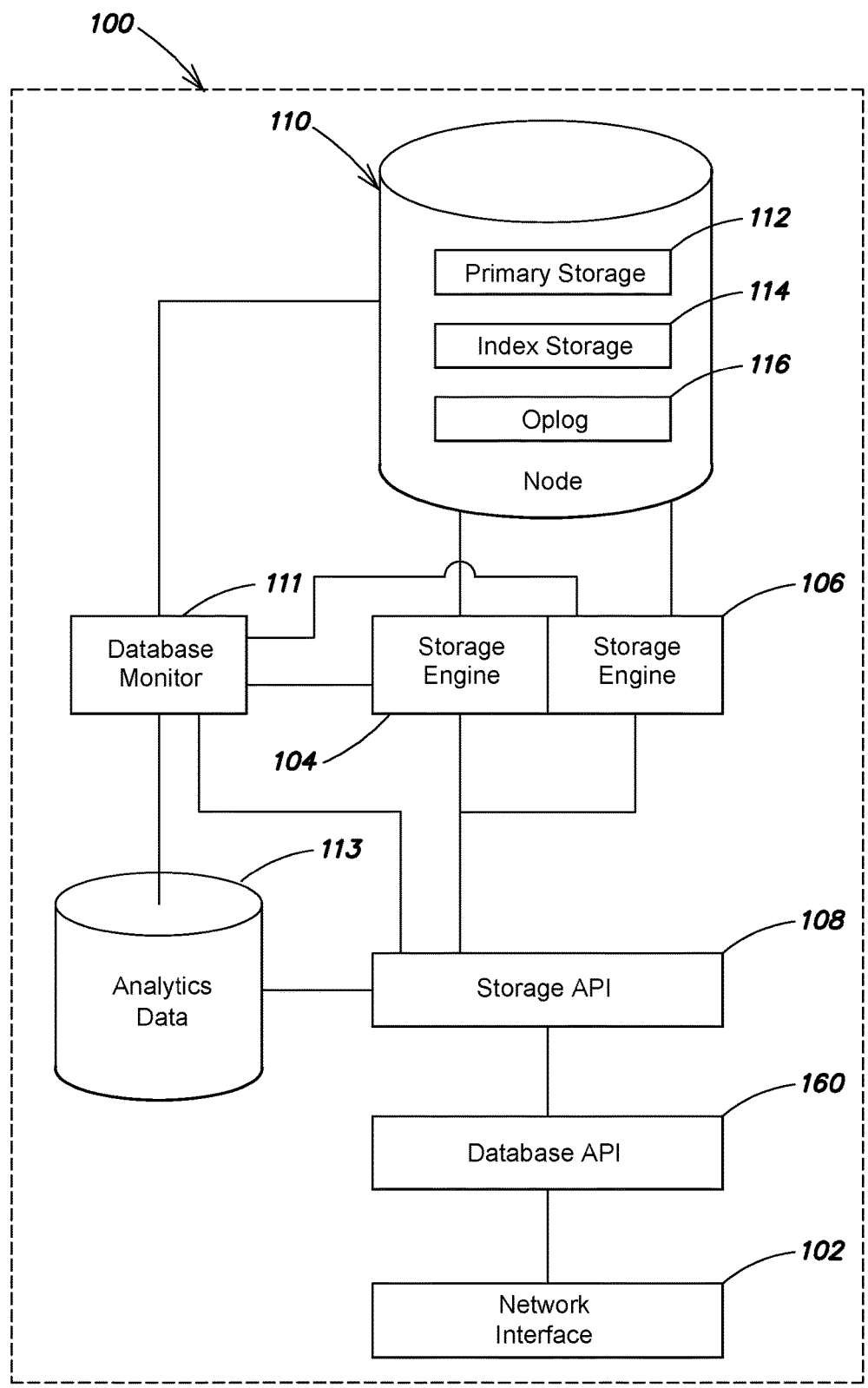
FIG. 1 illustrates a block diagram of an example architecture for a database server, according to aspects of the invention.

A system and method is provided for a database storage API capable of selectively mapping to different pluggable storage engines and storage formats. In a preferred embodiment, the database storage API is employed in a non-relational database system, in which documents or other structures not limited by a schema are stored. In one example, the selection of a particular storage engine and/or data format may be made by a user via a user interface. The user may be presented with one or more recommendations of optimal storage engines for a particular data structure, collection, or database according to one or more factors. In another example, the database engine may select a particular storage engine and/or data format, or the storage engine itself or other system components may select a particular data format based on one or more factors. For example, a storage engine and/or data format may be selected for its expected optimal performance as compared to other storage engine options.

The factors used to recommend or select an optimal storage engine or data format may relate to the type and breakdown of historical operations performed on the database (e.g., volume of write requests, volume or read requests, timing of writes and/or read, sparsity of data, etc.), and/or the characteristics of a set of operations predicted to be performed on the database. Such predictions can be made based on the layout of the data, the nature of the data, the data type (e.g., primary database data or database index data), historical operations for a given time period, database compression characteristics, or other aspects of the data and the operations to be performed on it. In some embodiments, a change in storage engines for a portion of the database is assessed to determine if the database performance with respect to that portion is more optimal before or after the change, so that appropriate measures may be recommended or taken.

Examples of the methods, devices, and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

An example of a database subsystem 100 is shown in FIG. 1. The database subsystem 100 includes an interface 102 for sending and receiving information (including database requests and responses thereto) to router processes, database clients, or other components or entities in the system. In one embodiment, the backend architecture is configured to interact with any data model provided by a managed database. For example, the managed database can include a non-relational data model. In another embodiment, the data model can be implemented in the form of replica sets as described in U.S. patent application Ser. No. 12/977,563, which is hereby incorporated by reference in its entirety. The database subsystem 100 includes a storage application. In one implementation described in greater detail below, a base unit of data is a document.

Database subsystem 100 includes an application programming interface (API) 108 that receives database requests, including requests to perform read and write operations. When a write operation is requested, the storage API 108 in response selectively triggers a first storage engine 104 or a second storage engine 106 configured to store data in a first data format or second data format, respectively, in node 110. As discussed in more detail below, a database monitor 111 may track a number of analytics about the database. In some embodiments, the database monitor 111 is configured to track the operations performed on the data over time, and stores that information as analytics data 113. In some examples, analytic data may be stored in a separate database. In other examples, the analytics data is stored as a name collection (i.e., a logical grouping of data). These analytics may be provided to the storage API 108, which relies on the analytics to selectively actuate an appropriate storage engine.

In one example, the database monitor 111 tracks the relative number of read and write operations performed on a collection within the database. In another example, the database monitor 111 is configured to track any operations (e.g., reads, writes, etc.) performed on any base unit of data in the database.

In some embodiments, the storage API 108 uses the tracked data (e.g., analytics data) collected by the database monitor 111 and/or the analytics data 113 to select an optimal storage engine and/or data format for a database, a collection, or a document having the observed read/write ratio. In one example, the storage API 108 is mapped to the selected storage engine. For example, an identifier of the selected storage engine may be stored in a location in memory or on disk; when a write operation request is received by the storage API 108, the identifier is used to identify and activate the storage engine. Alternatively, elements of the database can specify a mapping or association with a storage engine that can be manually edited, edited through an administrative interface, or automatically changed responsive to system monitoring. In other embodiments, the database monitor 111 itself is configured to determine an optimal storage engine based on the analytics data 113 and other aspects of the data, for example, stored in the database, database collection, or in a document. This determination may be passed to the storage API 108, or otherwise used to map the storage API 108 to a determined storage engine.

Figure 2:
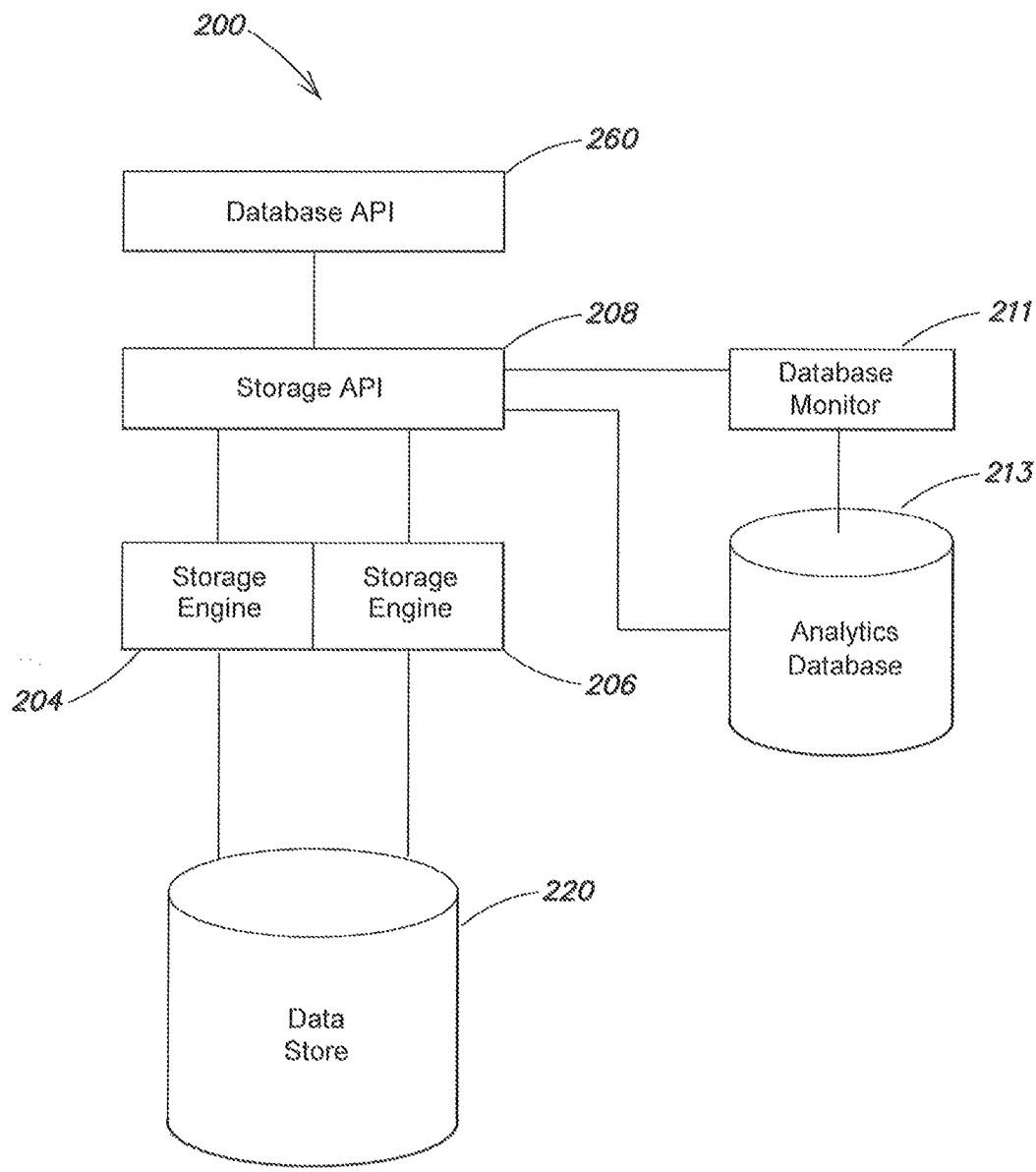
FIG. 2 illustrates a block diagram of an example architecture for a database application programming interface, according to aspects of the invention.

FIG. 2 shows a block diagram of an exemplary arrangement of a storage API 208, storage engines 204, 206, a database API 260, and other components of a managed database subsystem 200. The storage API 208 is configured to receive database operation requests from the database API 260. The database API 260, in turn, may receive instructions from an application or from a user submitting query language or otherwise providing instructions for performing operations associated with data in the managed database. In one example, the database API 260 is the primary interface through which programs and users interact with the data on the managed database subsystem 200. In one embodiment, the database API 260 passes a "write" operation request to the storage API 208. The storage API 208 then determines an appropriate data format in which to store the subject data of the requested write operation, and calls an appropriate storage engine (e.g., first storage engine 204 or second storage engine 206) configured to store the data in the appropriate data format in a data store 220. In some embodiments, the storage API 208 and/or a database monitor 211 may determine the appropriate data format based on analytics data 213 and other aspects of the data stored.

In an embodiment incorporating a replica set, a primary node executes a write operation on data, then passes the operation through an associated API (e.g., the database API 260) to a storage engine API 208. The storage API 208 in turn passes the write operation to a particular storage engine (e.g., storage engine 204), which would be responsible for any transformation or mapping of the data as required by the storage engine. The storage engine, upon receiving the request, stores the data in a storage format associated with the storage engine. In some embodiments, the storage engine may also perform any additional transformations or mappings of the data.

In one example, the storage API 208 is a set of protocols, functions, and data used by the database API 260 to perform operations on the database. In other words, the API as discussed herein provides both the programming interface to which commands are passed, as well as the underlying data and functionality for carrying out those commands. For example, the storage API 208 may provide functions for performing operations on the database, including write operations, read operations, or commit operations. Any necessary data or variables are passed to such functions, the details of which are carried out by the functionality of the storage API 208. The storage API 208 may be configured to perform operations on the nodes (e.g., primary node or secondary nodes) of a replica set, as discussed in more detail below with respect to FIGS. 3 and 4.

In some embodiments, the storage API 208 is in direct communication with the database API 260. In other embodiments, including those in which the managed database subsystem 200 is located on a server connected by a network to other database components, the storage API 208 may be in communication with a network interface configured to receive requests from the database API 260 and pass them to the storage API 208.

The first storage engine 204 and second storage engine 206 are configured to store database data in the data store 220 in one or more data formats. The embodiments discussed in this application discuss a non-relational database scenario. In such scenarios, a "document" is a collection of attribute-value associations relating to a particular entity, and in some examples forms a base unit of data storage for the managed database system. Attributes are similar to rows in a relational database, but do not require the same level of organization, and are therefore less subject to architectural constraints. A collection is a group of documents that can be used for a loose, logical organization of documents. It should be appreciated, however, that the concepts discussed herein are applicable to relational databases and other database formats, and this disclosure should not be construed as being limited to non-relational databases in the disclosed embodiments.

In one example, the database data may include logical organizations of subsets of database data. In one embodiment, the data is a collection of documents or other structures in a non-relational database. The data store 220 may also store index data, which may include copies of certain columns of data that are logically ordered to be searched efficiently. Each entry in the index may consist of a key-value pair that represents a document or field (i.e., the value), and provides an address or pointer to a low-level disk block address where the document or field is stored (the key). The data store 220 may also store an operation log ("oplog"), which is a chronological list of write/update operations performed on the data store during a particular time period. The oplog can be used to roll back or re-create those operations should it become necessary to do so due to a database crash or other error.

Primary data, index data, or oplog data may be stored in any of a number of database formats, including row store, column store, log-structured merge (LSM) tree, or otherwise. In row store format, all of the columns of a particular document are stored together in memory. For example, in a database of employee information, all of the information about a particular employee (e.g., name, address, SSN, salary, title) may be stored in a contiguous block of memory. Data in a row-store format may be stored to disk and represented as a B-tree, B+ tree, or variation thereof. B-trees and their variants are described in "The Ubiquitous B-Tree" by Douglas Comer (*Computing Surveys*, Vol. 11, No. 2, June 1979), which is hereby incorporated by reference in its entirety.

In column-store format, all instances of a particular field (or column) are stored together. In the employee database example, the salary of each employee may be stored in a contiguous block of memory. Column-store format is described in "C-Store: A Column Oriented DBMS" by Mike Stonebraker et al., (Proceedings of the 31st VLDB Conference, 2005), which is hereby incorporated by reference in its entirety.

Reading a particular document or field that is stored in row-store or column-store format generally involves using the index to locate and read the requested data from disk. But when a document or field is updated in row-store or column-store format, the entire row or column must be loaded from disk, the appropriate field(s) updated, and the entire row or column written back to disk. This read-and-write requirement may be costly in terms of input/output, particularly when the data being acted upon is subject to a relatively high number of writes. In LSM tree format, data to be overwritten (i.e., updated) is typically not read first; rather, updates to the data are simply written to disk, with a pointer to the new version of the data created. LSM tree format is described in "The Log-Structured Merge-Tree (LSM-Tree)" by Patrick O'Neil et al. (1996), which is hereby incorporated by reference in its entirety.

Returning again to FIG. 1, the storage API 108 receives database write requests (e.g., from database API 160) via a network interface 102, and carries out the requested operations by selectively triggering one of the first storage engine 104 and the second storage engine 106. The first storage engine 104 and the second storage engine 106 are executable software modules configured to store database data in the data node 110 in one or more data format. For example, the first storage engine 104 may be configured to store data in a row-store format, and the second storage engine 106 may be configured to store data in a LSM-tree format. In one example, the first storage engine 104 and/or the second storage engine 106 are configured store primary database data (i.e., the data being stored and queried) in a particular data format in the primary data storage 112, and may store database index data in a particular data format in index data storage 114. In one embodiment, the first storage engine 104 and/or the second storage engine 106 are configured store an oplog 116 in a particular data format. As discussed in more detail below, a database monitor 111 may track a number of analytics about the database, and the operations performed on it over time, and stores that information as analytics data 113. In some embodiments, analytics data about the performance of the storage engines may be stored as part of the first storage engine 104 and/or the second storage engine 106, and may not be stored separately as analytics data 113.

One advantage of using the storage API 108 as an abstraction layer between the database API and the storage engines is that the identity and selection of a particular storage engine can be transparent to the database API and/or a user interacting with the database API. For example, the database API may pass a "write" function call to the storage API 108 instructing the storage API to write a particular set of data to stable storage. The storage API 108 then determines, according to its own analysis and/or user input, which storage engine should perform the write operation in which data format. Different storage engines may be appropriate for different types of data stored in different collections that may undergo a variety of different operations. Thus, the choice and implementation of calls to an appropriate storage engine are made by the storage API 108, freeing the database API calls to simply request a "write" of certain data. This abstraction level allows for the implementation of the system on large filesystems that may be stored across machines in a database cluster, such as the Hadoop Filesystem offered by the Apache Software Foundation.

Another advantage of using the storage API 108 is the ability to add, remove, or modify storage engines without modifying the requests being passed to the API 108. The storage API 108 is configured to identify the available storage engines and select the appropriate one based on a one or more factors discussed below. The database API requesting write operations need not know the particulars of the storage engine selection or operation, meaning that storage engines may be embodied in pluggable modules that may be swapped out or modified. Thus, users are able to leverage the same query language, data model, scaling, security and operational tooling across different applications, each powered by different pluggable storage engines.

Figure 3:
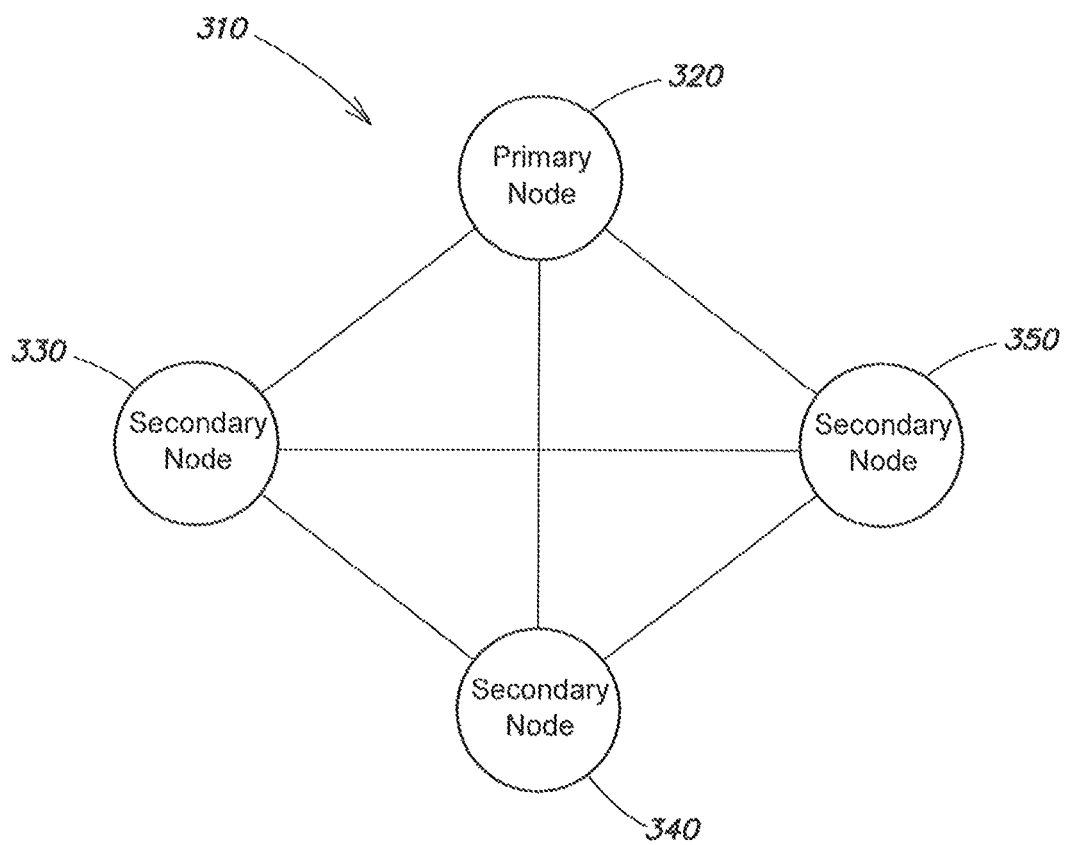
FIG. 3 illustrates a block diagram of an example architecture for a database replica set, according to aspects of the invention.

The embodiment shown and discussed with respect to FIG. 1 depicts a single storage node 110. Yet in some embodiments, multiple database nodes may be provided and arranged in a replica set. FIG. 3 shows a block diagram of an exemplary replica set 300. Replica set 310 includes a primary node 320 and one or more secondary nodes 330, 340, 350, each of which is configured to store a dataset that has been inserted into the database. The primary node 320 may be configured to store all of the documents currently in the database, and may be considered and treated as the authoritative version of the database in the event that any conflicts or discrepancies arise, as will be discussed in more detail below. While three secondary nodes 330, 340, 350 are depicted for illustrative purposes, any number of secondary nodes may be employed, depending on cost, complexity, and data availability requirements. In a preferred embodiment, one replica set may be implemented on a single server. In other embodiments, the nodes of the replica set may be spread among two or more servers.

The primary node 320 and secondary nodes 330, 340, 350 may be configured to store data in any number of database formats or data structures as are known in the art. In a preferred embodiment, the primary node 320 is configured to store documents or other structures associated with non-relational databases. The embodiments discussed herein relate to documents of a document-based database, such as those offered by MongoDB, Inc. (of New York, N.Y. and Palo Alto, Calif.), but other data structures and arrangements are within the scope of the disclosure as well.

In one embodiment, both read and write operations may be permitted at any node (including primary node 320 or secondary nodes 330, 340, 350) in response to requests from clients. The scalability of read operations can be achieved by adding nodes and database instances. In some embodiments, the primary node 320 and/or the secondary nodes 330, 340, 350 are configured to respond to read operation requests by either performing the read operation at that node or by delegating the read request operation to another node (e.g., a particular secondary node 330). Such delegation may be performed based on load-balancing and traffic direction techniques known in the art.

In some embodiments, the database only allows write operations to be performed at the primary node 320, with the secondary nodes 330, 340, 350 disallowing write operations. In such embodiments, the primary node 320 receives and processes write requests against the database, and replicates the operation/transaction asynchronously throughout the system to the secondary nodes 330, 340, 350. In one example, the primary node 320 receives and performs client write operations and generates an oplog. Each logged operation is replicated to, and carried out by, each of the secondary nodes 330, 340, 350, thereby bringing those secondary nodes into synchronization with the primary node 320. In some embodiments, the secondary nodes 330, 340, 350 may query the primary node 320 to receive the operation log and identify operations that need to be replicated. In other embodiments, the operation log may be transmitted from the primary node 320 to the secondary nodes 330, 340, 350 periodically or in response to the occurrence of a predefined condition, such as accruing a threshold number of operations in the operation log that have not yet been sent to the secondary nodes 330, 340, 350.

In some embodiments, the primary node 320 and the secondary nodes 330, 340, 350 may operate together to form a replica set 310 that achieves eventual consistency, meaning that replication of database changes to the secondary nodes 330, 340, 350 may occur asynchronously. When write operations cease, all replica nodes of a database will eventually "converge," or become consistent. This may be a desirable feature where higher performance is important, such that locking records while an update is stored and propagated is not an option. In such embodiments, the secondary nodes 330, 340, 350 may handle the bulk of the read operations made on the replica set 310, whereas the primary node 330, 340, 350 handles the write operations. For read operations where a high level of accuracy is important (such as the operations involved in creating a secondary node), read operations may be performed against the primary node 320.

It will be appreciated that the difference between the primary node 320 and the one or more secondary nodes 330, 340, 350 in a given replica set may be largely the designation itself and the resulting behavior of the node; the data, functionality, and configuration associated with the nodes may be largely identical, or capable of being identical. Thus, when one or more nodes within a replica set 310 fail or otherwise become available for read or write operations, other nodes may change roles to address the failure. For example, if the primary node 320 were to fail, a secondary node 330 may assume the responsibilities of the primary node, allowing operation of the replica set to continue through the outage. This failover functionality is described in U.S. application Ser. No. 12/977,563, the disclosure of which is hereby incorporated by reference.

Each node in the replica set 310 may be implemented on one or more server systems. Additionally, one server system can host more than one node. Each server can be connected via a communication device to a network, for example the Internet, and each server can be configured to provide a heartbeat signal notifying the system that the server is up and reachable on the network. Sets of nodes and/or servers can be configured across wide area networks, local area networks, intranets, and can span various combinations of wide area, local area and/or private networks. Various communication architectures are contemplated for the sets of servers that host database instances and can include distributed computing architectures, peer networks, virtual systems, among other options.

The primary node 320 may be connected by a LAN, a WAN, or other connection to one or more of the secondary nodes 330, 340, 350, which in turn may be connected to one or more other secondary nodes in the replica set 310. Connections between secondary nodes 330, 340, 350 may allow the different secondary nodes to communicate with each other, for example, in the event that the primary node 320 fails or becomes unavailable and a secondary node must assume the role of the primary node.

Figure 4:
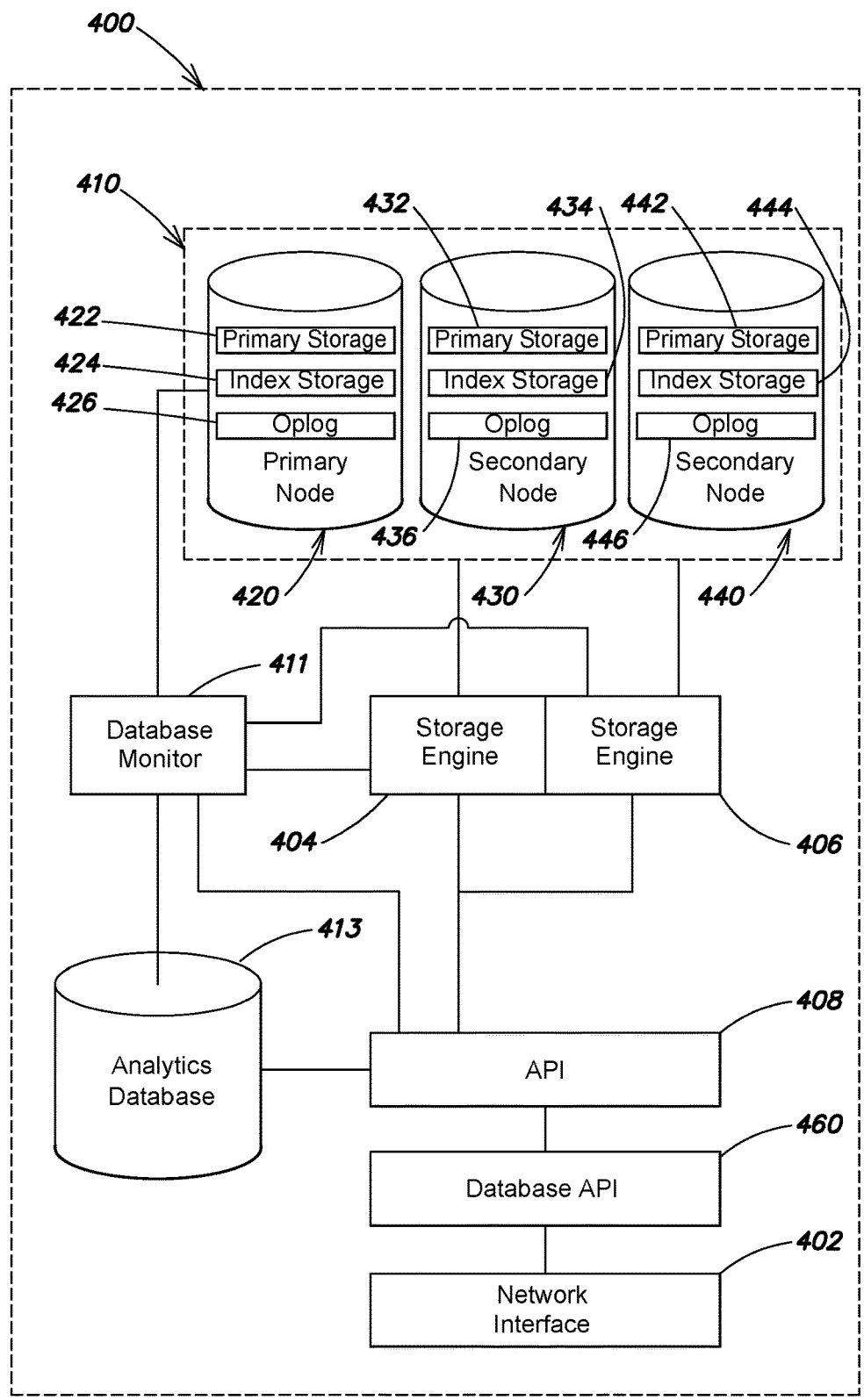
FIG. 4 illustrates a block diagram of an example architecture for a database server having a replica set, according to aspects of the invention.

An example of a database subsystem 400 incorporating a replica set 410 is shown in FIG. 4. As can be seen, database subsystem 400 incorporates many of the elements of database subsystem 100 of FIG. 1, but incorporates replica set 410 comprising primary node 420 and secondary nodes 430 and 440. In one example, the replica set 410 functions in much the same manner as the replica set 300 discussed with respect to FIG. 3. While only two secondary nodes 430 and 440 are shown for illustrative purposes, it will be appreciated that the number of secondary nodes may be scaled up or down as desired or necessary.

In one example, database operation requests directed to the replica set 410 may be processed by the primary node 420 and either performed by the primary node 420 or directed to a secondary node 430, 440 as appropriate. In one embodiment, both read and write operations are permitted at any node (including primary node 320 or secondary nodes 430, 440) in response to requests from clients. The scalability of read operations can be achieved by adding nodes and database instances. In some embodiments, the primary node 420 and/or the secondary nodes 430, 440 are configured to respond to read operation requests by either performing the read operation at that node or by delegating the read request operation to another node (e.g., a particular secondary node 430). Such delegation may be performed based on load-balancing and traffic direction techniques known in the art.

In some embodiments, the database only allows write operations to be performed at the primary node 420, with the secondary nodes 430, 440 disallowing write operations. In such embodiments, the primary node 420 receives and processes write requests against the database, and replicates the operation/transaction asynchronously throughout the system to the secondary nodes 430, 440. In one example, the primary node 420 receives and performs client write operations and generates an oplog. Each logged operation is replicated to, and carried out by, each of the secondary nodes 430, 440, thereby bringing those secondary nodes into synchronization with the primary node 420 under an eventual-consistency model.

In one example, primary database data (i.e., the data being stored and queried) may be stored by one or more data storage engines in one or more data formats in the primary data memory 422, 432, 442 of nodes 420, 430, 440, respectively. Database index data may be stored by one or more data storage engines in one or more data formats in the index data memory 424, 434, 444 of nodes 420, 430, 440, respectively. Oplog data may be stored by a data storage engine in a data format in oplog data memory 426, 436, 446 of nodes 420, 430, 440, respectively.

Figure 5:
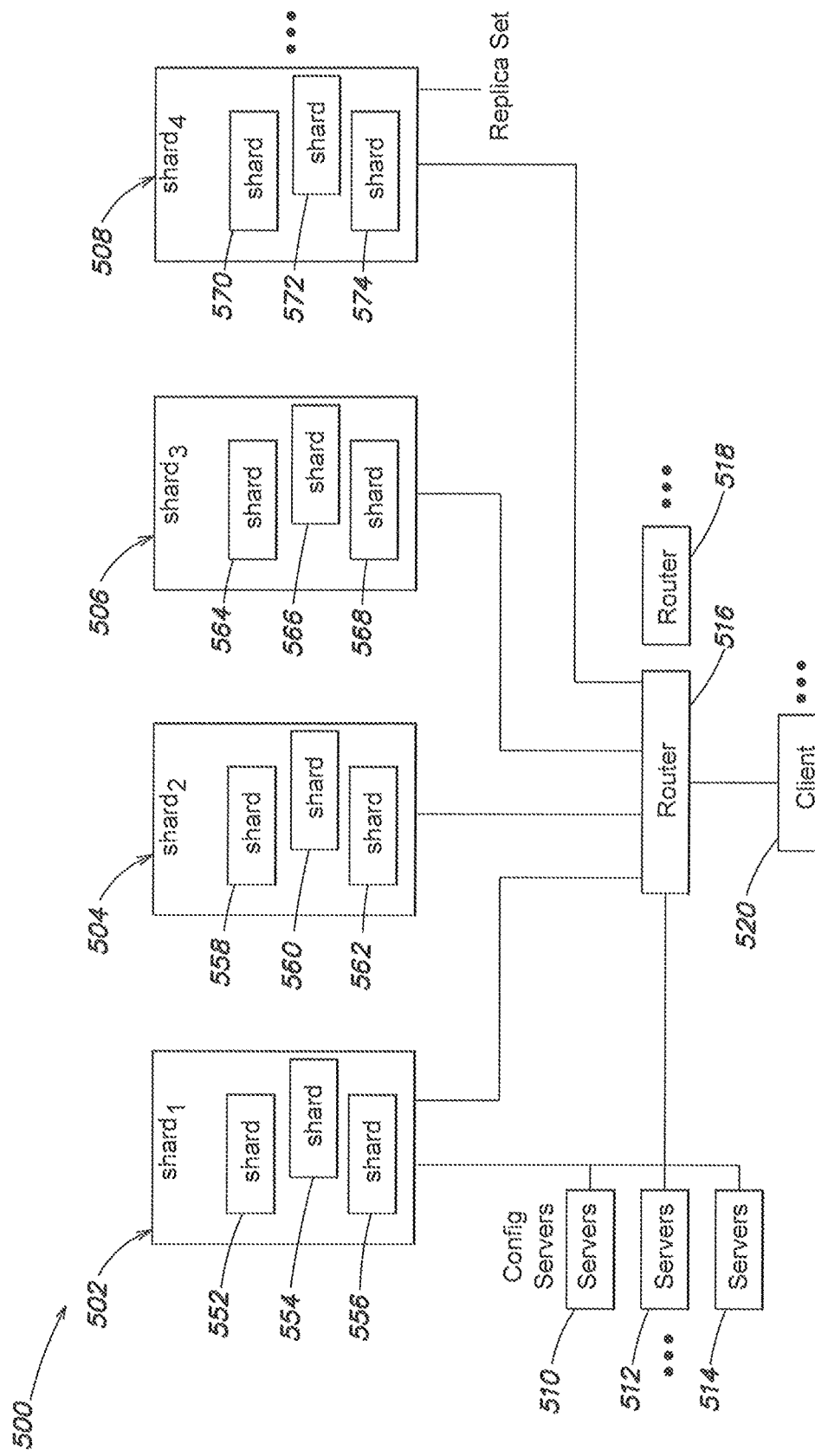
FIG. 5 illustrates a block diagram of an example architecture for a database system comprising shard servers, according to aspects of the invention.

FIG. 5 shows a block diagram of an example architecture for a managed database system 500 that is improved by integration of pluggable database storage engines. In some embodiments, implementation of pluggable database storage engines improves execution efficiency of the managed database system 500. According to one embodiment, the managed database system 500 has been specially configured as a shard cluster. In other embodiments, the managed database system 500 is organized as one or more replica sets as discussed above. In some embodiments, replica sets support or provide an underlying architecture for the shard cluster.

The shard cluster is the grouping of shards that collectively represent the data within the database, with each shard responsible for storing a particular range or subset of documents in the database. A shard cluster typically comprises multiple shard servers (e.g., 502-508) hosting multiple partitions (e.g., 552-574) or shards of data, one or more configuration servers (e.g., 510-514) for metadata management, and shard router processes (e.g., 516-518). Metadata for the shard cluster can include, for example, information on the ranges of data stored in each partition, information associated with managing the shard cluster, partition counts, number of shard servers, data index information, partition size constraints, data distribution thresholds, among other options.

Each shard of data (e.g., 552-574) can be configured to reside on one or more servers executing database operations for storing, retrieving, managing, and/or updating data. In some embodiments, a shard of data corresponds to a chunk of data. In other embodiments, a shard server 502 contains multiple partitions, or "chunks," of database data. A chunk can be configured as a contiguous range of data from a particular collection in the database. Collections are logical organizations of subsets of database data. In one example, a collection of documents is a named grouping of the data, for example, a named grouping of documents. The named grouping can be homogenous or heterogeneous. In some embodiments, collections are organizations of database data similar to relational database tables.

Configurations within a shard cluster can be defined by metadata associated with the managed database referred to as shard metadata. Shard metadata can include information on collections within a given database, the number of collections, data associated with accessing the collections, database key properties for a given collection, ranges of key values associated with a given partition, shard, and/or chunk of data within a given collections, to provide some examples.

In some embodiments, partitioning or sharding of the database in data chunks occurs based on database collections rather than the database as a whole. For example, when implementing a database management system for a service like the well-known TWITTER service, it is appreciated that the collection of "tweets" or messages within the database of the TWITTER service would be several orders or magnitude larger than the next largest collection. The size and throughput associated with the collection of tweets would be ideal for sharding, whereas smaller collections can be configured to reside on a single server. In some implementations, the data within the database is organized into documents. Some examples of document organization formats include the known JSON (JavaScript Object Notation) and BSON (binary encoded serialization of JSON) formatting for documents. BSON is a binary format in which zero or more key/value pairs are stored as a single entity. The BSON entity can be referred to as a document. In some examples, BSON adds some additional information to documents, like length prefixes, that make it the document easier and faster to traverse. BSON is also designed to be fast to encode and decode. For example, integers are stored as 32 (or 64) bit integers, so they don't need to be parsed to and from text. This uses more space than JSON for small integers, but may be much faster to parse. The choice between JSON and BSON may therefore be made according to traversal needs, storage efficiency, or other considerations.

Returning to FIG. 5, the three dots illustrated next to the system components indicate that additional instances of the system component may be included. In some embodiments, adding additional shards, configuration servers, and/or shard routing processes can increase the capacity of the managed database system. The shard router processes 516-518 handle incoming requests from clients 520 (e.g., applications, web services, user initiated requests, application protocol interfaces, etc.).

The router processes 516-518 are configured to provide a transparent interface to handle database requests. The shard router processes 516-518 receive such client requests and route the database requests to the appropriate shard(s), e.g., 552-574 on shard servers 502-508. According to some embodiments, a router process, e.g., 516, can be configured to operate as a routing and coordination process that makes the various components of the cluster look like a single system, for example, to client 520. In response to receiving a client request, the router process 516 routes the request to the appropriate shard or shards. The shard(s) return any results to the router process. The router process 516 can merge any results and communicate the merged result back to the client 520. Thus, the client 520 may submit requests through router processes 516-518 without regard to whether the request is being served by a sharded database, or the specifics of the implementation of such a database.

In some examples, the router process 516 is also configured to establish current state information for the data distributed throughout the database by requesting metadata information on the database from the configuration server(s) 510-514. The request for metadata information can be executed on startup of a routing process. Further requests can be initiated by the routing process and/or can be initiated by a configuration server. In one example, a change at the configuration server can trigger a distribution of updates to any routing processes. In some embodiments, any changes that occur on the configuration server(s) can be propagated to each router process 516-518, as needed. In one example, router processes 516-518 can be configured to poll the configuration servers(s) 510-514 to update their state information periodically. In others examples, router processes can be configured to poll the configuration servers(s) 510-514 to update their state information on a schedule, periodically, intermittently, and can be further configured to receive updates pushed from the configuration server(s) 510-514 and/or any combination of thereof. According to one embodiment, the router processes capture metadata information on the shard cluster stored at the configuration servers. In some examples, the metadata information includes information on the data stored in the database, how the data is partitioned, version information associated with the partitions, database key values associated with partitions, read/write statistics, partition size, the current storage engine(s) associated with the partitions, etc. According to some embodiments, the router process 516 can be configured without persistent state information. For example, at initiation, the router process 516 cannot fully route data requests until its state is updated with the metadata describing the distribution of data throughout the shards.

According to some embodiments, router processes can run on any server within the managed database and/or on any number of server(s) as desired. For example, the router processes can be executed on stand-alone systems, and in other examples the router processes can be run on the shard servers themselves. In yet another example, the router processes can be run on application servers associated with the managed database. Under typical installations, there are no limits on the number of router processes that can be invoked. The addition of routing processes can permit the managed database to route greater number of requests to the appropriate shards of data. In some embodiments, additional routing processes can enable additional client connections to the partitioned database. In other embodiments, additional routing processes can facilitate management of the distribution of data within the database.

According to one embodiment, configuration server(s) 510-514 are configured to store and manage the database's metadata. In some examples, the metadata includes basic information on each shard in the shard cluster (including, for example, network communication information), server information, number of chunks of data, chunk version, number of shards of data, shard version, and other management information for routing processes, database management processes, chunk splitting processes, etc. According to some embodiments, chunk information, such as the range or subset of information for which a shard is responsible, can be the primary data stored by the configuration server(s) 510-514. In some examples, chunks are defined by a triple (collection, minKey, and maxKey) and the metadata stored on the configuration servers establishes the relevant values for a given chunk of data.

In some examples, each of the installed configuration server(s) has a complete copy of all the chunk metadata information for the managed database.

In addition to the consistency processes executed on the configuration servers, the shard cluster can be configured with various replication models to insure consistent replication of any changes to the database's metadata stored on the configuration servers. In some embodiments, the replication model for the configuration servers can be different from the replication model used within the rest of the shard cluster, for example, on the shard servers 502-508. In one embodiment, the configuration servers can be configured to perform operations under various all-or-nothing approaches while the data stored in database shards can be configured to operate under an eventual consistency model.

To partition a collection, a shard key pattern can be specified. The shard key pattern, in some embodiments, can be similar to the key pattern used to define an index. The shard key pattern establishes one or more fields to define the shard key upon which the managed database can distribute data. According to some embodiments, establishing an appropriate shard key facilitates the efficient management of data within the shard cluster. In some embodiments, the shard key pattern can be input through a management process. The shard key pattern can be predefined and/or dynamically generated. Once established, the shard key pattern can be used to control the partitioning of data. The resulting chunks of data are typically constructed of contiguous ranges of data.

Figure 6:
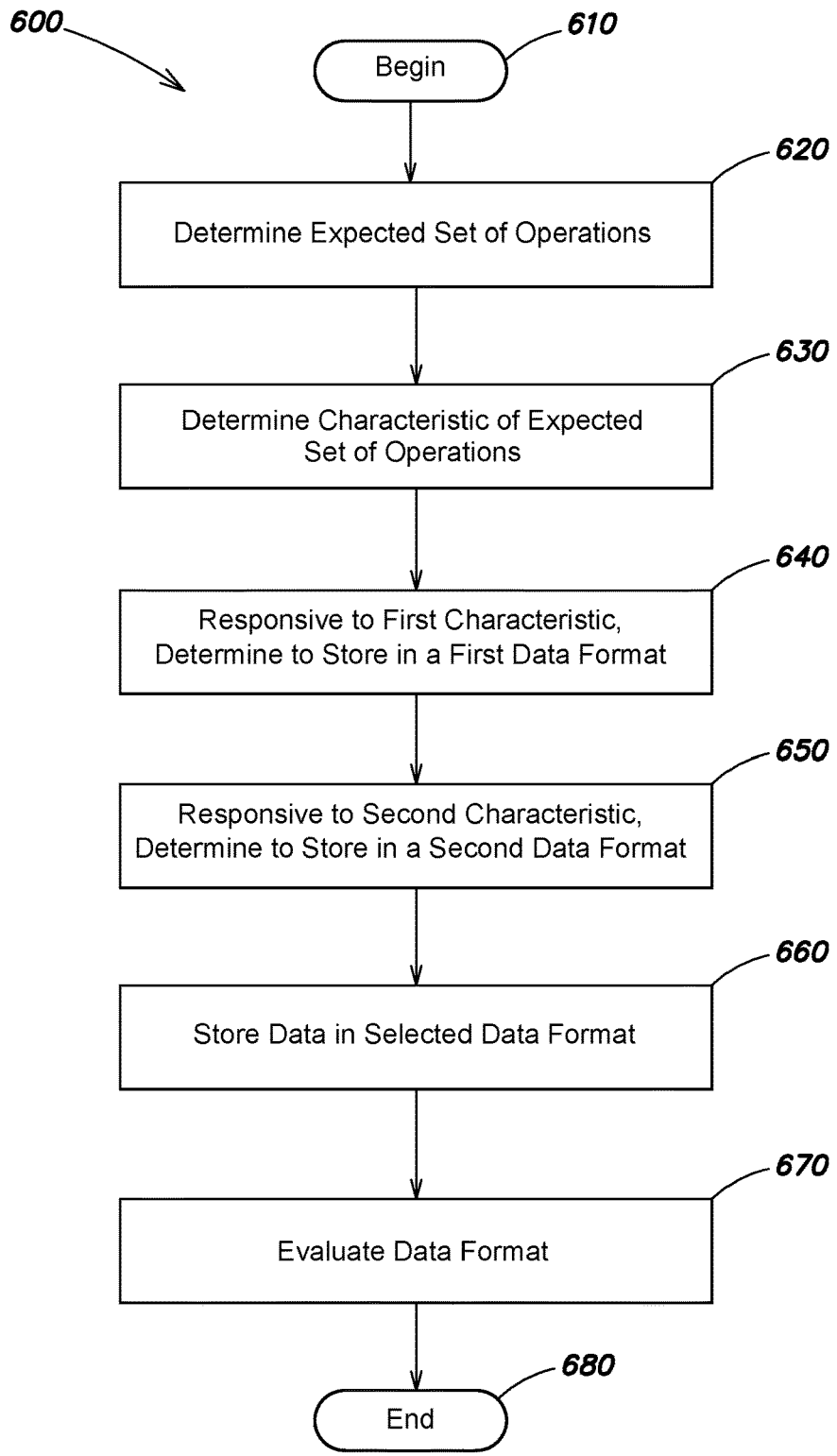
FIG. 6 illustrates an example process flow for selecting a data format for a portion of the database, according to aspects of the embodiment.

A process 600 of operating a storage API on a database server (e.g., the shard server 500 depicted in FIG. 5) is shown in FIG. 6.

At step 610, process 600 begins.

At step 620, an expected set of operations to be performed on a portion of a database is determined. In one embodiment, the portion of the database stores one type of information, such as primary data, index data, or an oplog, for that database. In some embodiments, the portion of the database may not represent the entirety of that type of data. For example, where the portion of the database is some subset of the primary data, other portions of the database may also store primary data. Furthermore, the portion of the database may represent a single document, a collection of documents, or the entire database.

In some embodiments, the expected set of operations is determined based on the type of data stored in the portion of the database. Different data types often have different characteristics that may help in identifying or predicting an expected set of operations. For example, a portion of the database storing an oplog may be expected to undergo more write operations than read operations, since each operation performed on the primary data of the database will be written to the oplog, but the oplog will only be read relatively occasionally (e.g., in the event of a database failure or data inconsistency). By contrast, primary data in the database may be more likely to have a higher number of read operations, since database queries often represent a significant portion of the operations performed on the database.

In some embodiments, the amortized cost of a typical operation may be considered. For example, primary data is considered to have a relatively high locality of reference, meaning that, when performing an operation on a piece of stored data, the data in nearby memory locations is more likely to be relevant/required in related operations than a randomly selected memory location. When a document is stored in row-store format, for example, the data is stored contiguously; reading multiple blocks of data in one read operation is likely to yield several useful pieces of data in responding to a query. Thus, the cost (in time) of that read operation may be amortized over the number of relevant pieces of data read during that operation. For example, if a read operation takes x amount of time, but is able to read in 10 pieces of information needed in responding to the current query, then the amortized cost of that read operation may be considered x/10. In some embodiments, this amortized cost may be used in determining the expected set of operations.

Relatedly, in some embodiments, the expected set of operations is determined based on the nature of the data stored in the portion of the database. As discussed above, primary data may be expected to have a relatively higher proportion of read operations than oplog data. It will also be appreciated that the nature of some types of primary data, for example, may be used in identifying or predicting an expected set of operations. For example, a portion of a database that stores product information for an ecommerce store that rarely changes its product offerings may be expected to have a relatively high number of read operations as opposed to write operations, since the product information may often be accessed (i.e., read) by visitors to the website but may rarely be updated (i.e., written) by the store administrator. On the other hand, a portion of a database that stores inventory information for a high-volume ecommerce store may be expected to have a relatively high number of both read and write operations, as visitor purchases necessitate verifying (i.e., reading) and updating (i.e., writing) the inventory information to the database. As another example, a node may be set up for the purpose of performing data mining, suggesting that the node will undergo mostly read operations once it is set up.

In some embodiments, the expected set of operations is determined based on a historical analysis of the portion of the database and the other data (and metadata) available for that portion of the database. For example, the oplog may be consulted to determine how many read operations are performed on a portion of the database storing primary data. In some embodiments, a tally may be kept of the number and type of operations performed on the portion of the database during a particular time period. These operation tallies may be used to determine, for a particular time period, the relative proportions of read and write operations performed on the portion of the database. Those relative proportions may then be considered in identifying or predicting an expected set of operations to be performed on the portion of the database. For example, where a database index has historically undergone many more read operations than write operations, it may be concluded that the expected set of operations for that portion of the database storing the database index will continue to have a proportionally higher number of read operations. In some embodiments, more recent historical data is weighted more heavily than older data, so that a recent change in the way the portion of the database is being used (e.g., the primary data has started to undergo a higher proportion of reads than writes) will be appropriately taken into account in identifying an expected set of operations in the future.

In some embodiments, an analogous historical period is identified, and analytics from that period referred to, in determining the expected set of operations. In some embodiments, the time of day, day of week, day of month, or dates of the year are taken into account in identifying an expected set of operations. In one example, it may be determined that the beginning of the month is a busy time for website-based enrollments in a program, and therefore a large number of write operations may be expected. Similarly, in another example, it may be determined that a database supporting an e-commerce store performs an extraordinary number of read operations in the days following the U.S. Thanksgiving holiday, as shoppers browse for holiday purchases. These insights into past time periods may be used to predict an expected set of operations in a current corresponding time period.

In some embodiments, the expected set of operations to be determined may include more than the read and write operations. For example, it may be determined, based on a user profile, historic practice, or configuration parameters that data will be written and read in a compressed format in order to save storage space. In such embodiments, considerations relating to those operations may also be considered.

The factors considered in making the determinations above may be considered in conjunction with one another. In one embodiment, the layout of the portion of the database, such as a collection of documents, may be considered along with the historical ways in which the data in the collection is accessed. For example, the documents in a collection may have a large number of fields, only some of which are populated or accessed. (This situation may be considered analogous to a "wide" table having many columns, only few of which are populated.) In this example, where only a relative few fields are being accessed, a determination may be made that it should be expected that reading a small number of fields from many documents is more likely to occur than reading entire documents.

At step 630, a characteristic is determined of the expected set of operations to be performed on the portion of the database. The characteristic may be a count, threshold, minimum or maximum amount, ratio, percentage, or other measurement based on, derived from, or calculated from the expected set of operations. In some embodiments, the characteristic is the relative number of expected read operations as compared to write operations, which may be expressed as a read/write ratio. In some embodiments, this read/write ratio may be weighted according to the predicted speed of performing various operations on the portion of the database, given the arrangement of the database. For example, read operations on a relatively small collection, most or all of which can be stored in memory, may be performed relatively quickly. Operations performed on a larger collection may likely require more reads from disk, which are typically quite a bit slower than memory reads. The relatively "expensive" read operations in the latter case may be a characteristic considered in determining what data format should be used. For example, "expensive" read operations may be assigned a weighted value of greater than 1.0 read operations, whereas more "inexpensive" read operations (such as those from memory) may be assigned a weighted value of 1.0 read operations.

At step 640, responsive to the expected set of operations having a first characteristic, a determination is made to store the portion of the database in a first data format, and at step 650, responsive to the expected set of operations having a second characteristic, a determination is made to store the portion of the database in a second data format. Thus, depending on the characteristics of the set of operations expected for the portion of the database, the portion of the database may be configured to store the data in a selected one of a number of formats.

In one embodiment, the determination to store data in a given format is made with respect to the weighted or unweighted read/write ratio discussed above. For example, where the read/write ratio is relatively high (i.e., a proportionally higher number of read operations may be expected for the portion of the database), a data format most suited for a high volume of read operations is identified. In this example, a row-store format or column-store format may be selected. In some embodiments, the selection is made with respect to other characteristics of the data, as discussed above. For example, where multiple fields within a document are likely to be read (e.g., retrieving employee profiles from a database storing individual employee information in a document), a row-store format may be suitable, since in a row-store format the document fields are stored in contiguous memory locations. Where a single field is likely to be read from multiple documents (e.g., reading salary information for an entire company), a column-store format may be suitable, since in a column-store format all values for a particular field are stored in contiguous memory locations. As another example, where the read/write ratio is relatively low (i.e., a proportionally higher number of write operations may be expected for the portion of the database), a data format most suited for a high volume of write operations is selected. In this example, a LSM-tree format is selected.

In some embodiments, the determination to store data in a given format may be made with reference to other expected operations beyond read and write operations. For example, if it was determined in step 620 that the portion of the database is likely to be compressed in order to save storage space, the determination may be made to store the data in a format conducive to compression. For example, it is known that a collection of like types of data may be more efficiently compressed than a collection of disparate types of data, given the techniques that can be applied to homogeneous data. In such a situation, it may therefore be suitable to store the data in a column-store format, keeping like values (i.e., fields) contiguous and enjoying the benefits of compression of homogeneous data.

In optional step 660, the portion of the database is stored in the selected data format. In some embodiments, the entire portion of the database is stored in the selected data format as soon as practicable. In other words, the entire portion of the database may be stored in the selected data format at the next available opportunity. In other embodiments, the portion of the database is stored in the selected data format as write operations occur. In such embodiments, the migration to the selected format occurs gradually.

In optional step 670, at some point in time after the portion of the database is stored in the selected data format, the benefit or effect of the selection of the data format is assessed by comparing the performance of the system both before and after the selection according to various metrics. For example, the average time to perform a write operation and/or a read operation may be compared from before and after the format was selected and put into use. If the average time has gotten smaller (i.e., the database is more quickly performing operations), then the selected format may be considered an improvement over the previous format. On the other hand, if performance has not improved or has degraded, the system may determine whether the previous format should be reverted to. In some embodiments, the administrators or users of the system may be alerted to the possibility that the selected format is not an improvement, and options may be provided to select the previous format, continue to use the current format, or perform additional analysis.

Process 600 ends at step 680.

It will be appreciated that process 600 may be performed with respect to individual nodes within a replica set, selecting a suitable data format for each portion of the database stored on each node. Thus, with reference to FIG. 4, a portion of the database stored on primary node 420 may be stored in a different selected format than the corresponding portion of the database stored on secondary node 430. For example, the primary data 422 may be stored in primary node 420 in an LSM-tree format, since as discussed above, in some embodiments the primary node 420 may be responsible for handling the write operations directed to the replica set. On the other hand, the corresponding primary data 432 in secondary node 430 may be stored in a row-store format, since in such embodiments the secondary nodes 430, 440 may be responsible for handling read operations directed to the replica set. The system may be configured to migrate data from the primary node 420 to the secondary nodes 430, 440, handling such migration according to the selected data format for that portion of the database on each node.

Figure 7:
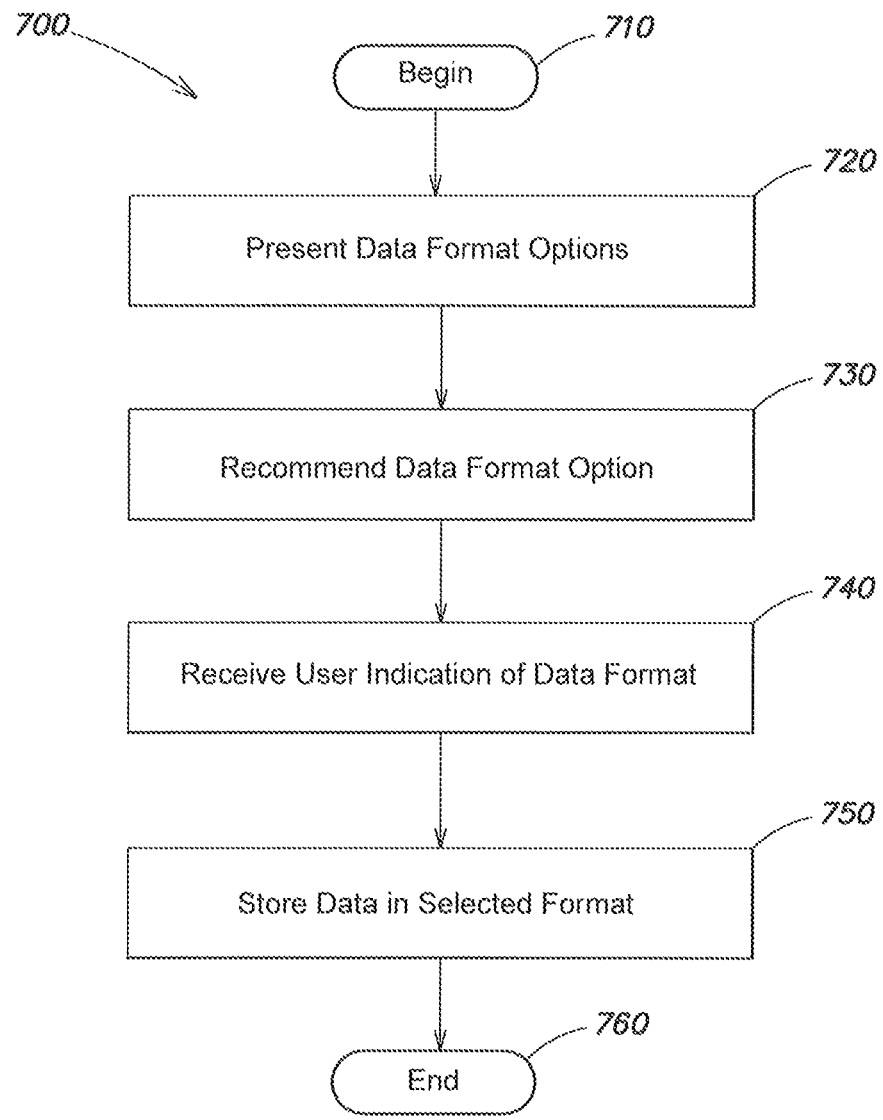
FIG. 7 illustrates another example process flow for selecting a data format for a portion of the database, according to aspects of the embodiment.

A process 700 of operating a database server (e.g., the shard server 500 depicted in FIG. 5) is shown in FIG. 7, wherein a user of the system is provided an option to select a storage format.

At step 710, process 700 begins.

At step 720, one or more data format selection options for a portion of a database may be presented to a user. The user may be an administrator of the database system, or may be any user with credentials that allow for selection of a data format for the portion of the database. In a preferred embodiment, the user interacts with the system via a user interface allowing for the selection of data formats to be used in storing a portion of the database. A screen may be displayed to the user providing the option to identify a portion of the database and choose a desired data format in which to store that portion of the database. In some embodiments, a storage engine selector may assist with the decision by providing analytics and recommendations enabling an informed decision regarding the storage format. For example, the user may be presented with an interface showing the historical read/write operation ratio for particular period of time, which may be configurable. Other analytics and metadata about the database (or the portion of the database to be stored) may also be presented, including the size and layout of the data.

At optional step 730, one or more recommendations may be presented to the user regarding data format options for the portion of the database. The recommendation may be formed based on the considerations discussed above with respect to steps 730 and 740 of process 700. For example, the type of data, amortized cost of a typical operation, the nature of the data, a historical analysis of the portion of the database and the other data (and metadata) available for that portion of the database, compression, and other considerations may be taken into account. In some embodiments, a plurality of recommendations is provided in a prioritized order determined by the system.

In some embodiments, before or concurrent with the user being provided with one or more recommendations, the user may be presented with the option to identify priorities for the database. For example, the user may be asked to place a relative importance on the speed of read operations, the speed of write operations, and the like. In some embodiments, configuration decisions made by the user may also affect the recommendations. For example, the user may be queried whether compression will be used on the portion of the database. If so, a data format suitable for compression may be recommended.

In some embodiments, the user may be provided with the option to identify multiple data formats, from which one is selected based on thresholds that the user also provides. For example, the user may be prompted to enter a threshold read/write ratio (e.g., 80%) at which a portion of the database that meets that threshold at a given time will be stored in a chosen format (e.g., row-store format). The user may be provided the option to be prompted to switch to such a data format when the threshold is reached, or to have the switch be made automatically. In some embodiments, the threshold must be met or exceeded for a certain amount of time before the switch is enacted, to avoid too-frequent format changes in the event of temporary activity.

In step 740, the user's selection of one or more data formats is received through a user interface.

In step 750, the portion of the database is stored in the selected data format. In some embodiments, the entire portion of the database is stored in the selected data format as soon as practicable. In other words, the entire portion of the database may be stored in the selected data format at the next available opportunity. In other embodiments, the portion of the database may be stored in the selected data format at a time selected by the user. For example, when selecting the data format (or the threshold for switching to the data format), the user may be prompted whether the change should go into place right away, or should be deferred for some amount of time or until some event occurs. The user may be given the option to defer the change for a certain number of minutes or hours, or may be given the option to have the change applied at a time of low database activity (for example, during the middle of the night).

In still other embodiments, the portion of the database is stored in the selected data format as write operations occur. In such embodiments, the migration to the selected format occurs gradually.

Process 700 ends at step 760.

The various processes described herein can be configured to be executed on the systems shown by way of example in FIGS. 1-4. The systems and/or system components shown can be programmed to execute the processes and/or functions described.

Additionally, other computer systems can be configured to perform the operations and/or functions described herein. For example, various embodiments according to the present invention may be implemented on one or more computer systems. These computer systems may be, specially configured, computers such as those based on Intel Atom, Core, or PENTIUM-type processor, IBM PowerPC, AMD Athlon or Opteron, Sun UltraSPARC, or any other type of processor. Additionally, any system may be located on a single computer or may be distributed among a plurality of computers attached by a communications network.

A special-purpose computer system can be specially configured as disclosed herein. According to one embodiment of the invention the special-purpose computer system is configured to perform any of the described operations and/or algorithms. The operations and/or algorithms described herein can also be encoded as software executing on hardware that defines a processing component, that can define portions of a special purpose computer, reside on an individual special-purpose computer, and/or reside on multiple special-purpose computers.

Figure 8:
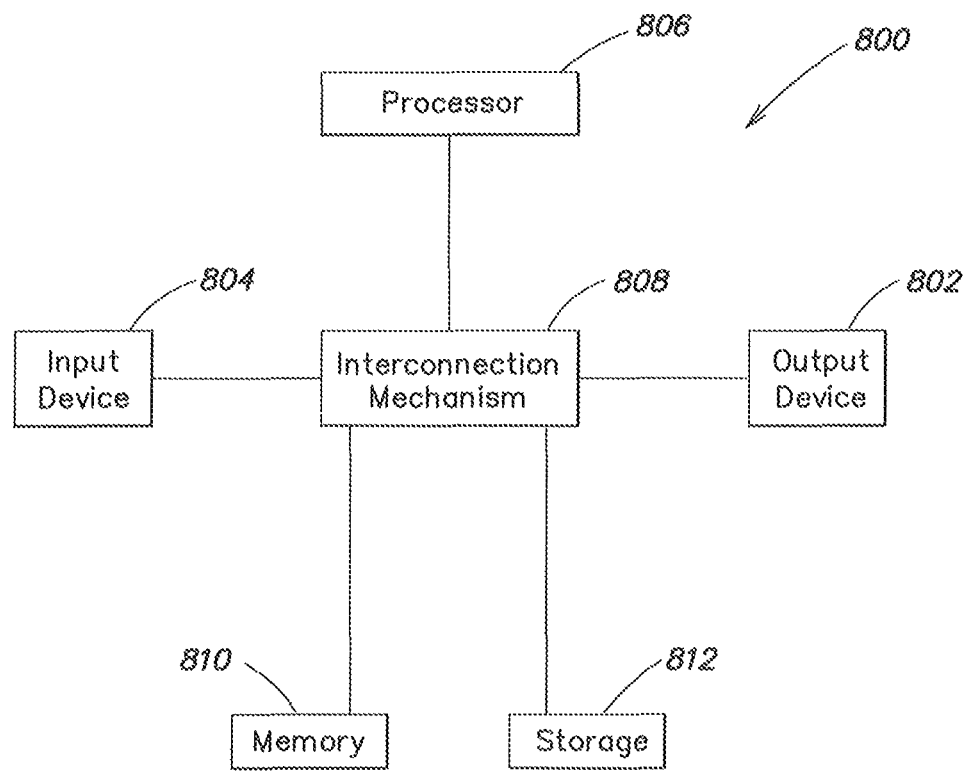
FIG. 8 is a block diagram of an example distributed database system in which various aspects of the present invention can be practiced.

FIG. 8 shows a block diagram of an example special-purpose computer system 800 on which various aspects of the present invention can be practiced. For example, computer system 800 may include a processor 806 connected to one or more memory devices 810, such as a disk drive, memory, or other device for storing data. Memory 810 is typically used for storing programs and data during operation of the computer system 800. Components of computer system 800 can be coupled by an interconnection mechanism 808, which may include one or more busses (e.g., between components that are integrated within a same machine) and/or a network (e.g., between components that reside on separate discrete machines). The interconnection mechanism enables communications (e.g., data, instructions) to be exchanged between system components of system 800.

Computer system 800 may also include one or more input/output (I/O) devices 802-804, for example, a keyboard, mouse, trackball, microphone, touch screen, a printing device, display screen, speaker, etc. Storage 812, typically includes a computer readable and writeable nonvolatile recording medium in which computer executable instructions are stored that define a program to be executed by the processor or information stored on or in the medium to be processed by the program.

Figure 9:
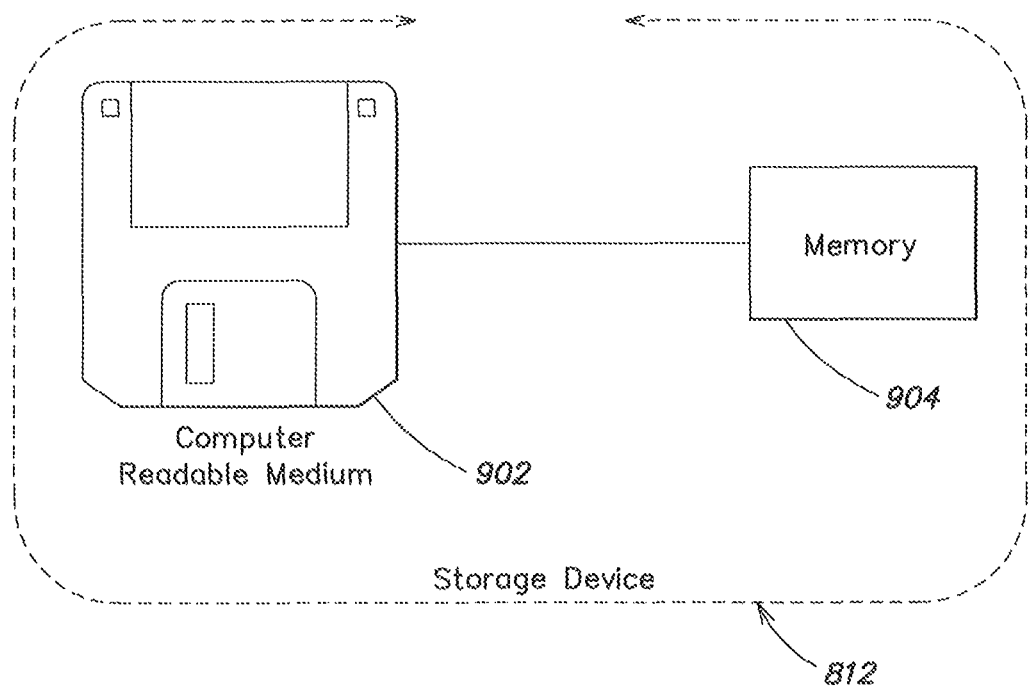
FIG. 9 is a block diagram of an example distributed database system in which various aspects of the present invention can be practiced.

The medium can, for example, be a disk 902 or flash memory as shown in FIG. 9. Typically, in operation, the processor causes data to be read from the nonvolatile recording medium into another memory 904 that allows for faster access to the information by the processor than does the medium. This memory is typically a volatile, random access memory such as a dynamic random access memory (DRAM) or static memory (SRAM). According to one embodiment, the computer-readable medium comprises a non-transient storage medium on which computer executable instructions are retained.

Referring again to FIG. 8, the memory can be located in storage 812 as shown, or in memory system 810. The processor 806 generally manipulates the data within the memory 810, and then copies the data to the medium associated with storage 812 after processing is completed. A variety of mechanisms are known for managing data movement between the medium and integrated circuit memory element and the invention is not limited thereto. The invention is not limited to a particular memory system or storage system.

The computer system may include specially-programmed, special-purpose hardware, for example, an application-specific integrated circuit (ASIC). Aspects of the invention can be implemented in software, hardware or firmware, or any combination thereof. Although computer system 800 is shown by way of example, as one type of computer system upon which various aspects of the invention can be practiced, it should be appreciated that aspects of the invention are not limited to being implemented on the computer system as shown in FIG. 8. Various aspects of the invention can be practiced on one or more computers having a different architectures or components than that shown in FIG. 8.

It should be appreciated that the invention is not limited to executing on any particular system or group of systems. Also, it should be appreciated that the invention is not limited to any particular distributed architecture, network, or communication protocol.

Various embodiments of the invention can be programmed using an object-oriented programming language, such as Java, C++, Ada, or C# (C-Sharp). Other programming languages may also be used. Alternatively, functional, scripting, and/or logical programming languages can be used. Various aspects of the invention can be implemented in a non-programmed environment (e.g., documents created in HTML, XML or other format that, when viewed in a window of a browser program, render aspects of a graphical-user interface (GUI) or perform other functions). The system libraries of the programming languages are incorporated herein by reference. Various aspects of the invention can be implemented as programmed or non-programmed elements, or any combination thereof.

Figure 10:
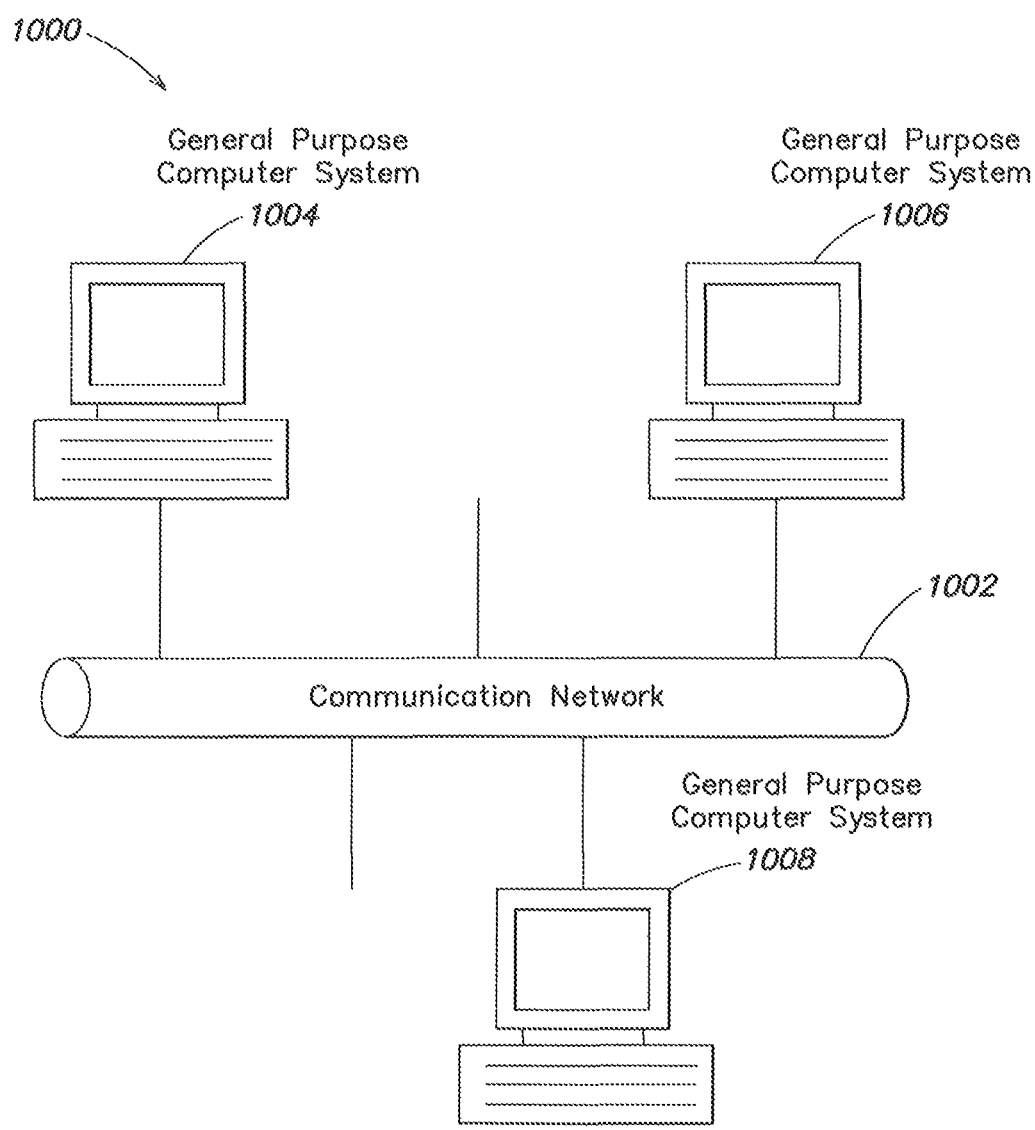
FIG. 10 is a block diagram of an example distributed database system in which various aspects of the present invention can be practiced.

Various aspects of this invention can be implemented by one or more systems similar to system 1000 shown in FIG. 10. For instance, the system can be a distributed system (e.g., client server, multi-tier system) that includes multiple special-purpose computer systems. In one example, the system includes software processes executing on a system associated with hosting database services, processing operations received from client computer systems, interfacing with APIs, receiving and processing client database requests, routing database requests, routing targeted database request, routing global database requests, determining global a request is necessary, determining a targeted request is possible, verifying database operations, managing data distribution, replicating database data, migrating database data, etc. These systems can also permit client systems to request database operations transparently, with various routing processes handling and processing requests for data as a single interface, where the routing processes can manage data retrieval from database partitions, merge responses, and return results as appropriate to the client, among other operations.

There can be other computer systems that perform functions such as hosting replicas of database data, with each server hosting database partitions implemented as a replica set, among other functions. These systems can be distributed among a communication system such as the Internet. One such distributed network, as discussed below with respect to FIG. 10, can be used to implement various aspects of the invention. Various replication protocols can be implemented, and in some embodiments, different replication protocols can be implemented, with the data stored in the database replication under one model, e.g., asynchronous replication of a replica set, with metadata servers controlling updating and replication of database metadata under a stricter consistency model, e.g., requiring two phase commit operations for updates.

FIG. 10 shows an architecture diagram of an example distributed system 1000 suitable for implementing various aspects of the invention. It should be appreciated that FIG. 10 is used for illustration purposes only, and that other architectures can be used to facilitate one or more aspects of the invention.

System 1000 may include one or more specially configured special-purpose computer systems 1004, 1006, and 1008 distributed among a network 1002 such as, for example, the Internet. Such systems may cooperate to perform functions related to hosting a partitioned database, managing database metadata, monitoring distribution of database partitions, monitoring size of partitions, splitting partitions as necessary, migrating partitions as necessary, identifying sequentially keyed collections, optimizing migration, splitting, and rebalancing for collections with sequential keying architectures.

Having thus described several aspects and embodiments of this invention, it is to be appreciated that various alterations, modifications and improvements will readily occur to those skilled in the art. Such alterations, modifications, and improvements are intended to be part of this disclosure, and are intended to be within the spirit and scope of the invention. Accordingly, the foregoing description is by way of example only.

Use of ordinal terms such as "first," "second," "third," "a," "b," "c," etc., in the claims to modify or otherwise identify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A database system comprising:
   a database;
   at least one processor configured to execute a plurality of system components, wherein the system components comprise:
   a plurality of storage engines configured to store data in the database in a plurality of different data formats;
   a storage application program interface (API) configured to receive requests from a client to perform operations on the database;
   an operation prediction component configured to determine an expected set of operations to be performed on a portion of the database; and
   a data format selection component configured to select, based on at least one characteristic of the expected set of operations, a data format of the plurality of different data formats for storing data in the portion of the database, wherein the selected data format optimizes execution of the expected set of operations on the portion of the database relative to another one of the plurality of data formats;
   wherein the storage API is configured to trigger execution of at least one of the plurality of storage engines responsive to a request to perform a write operation, the at least one storage engine configured to write data to the portion of the database in the selected data format.

2. The system of claim 1, wherein the operation prediction component is further configured to access information about a past set of operations for a first time period, and predict, based on the past set of operations for the first time period, an expected set of operations to be performed on the portion of the database during a second time period.

3. The system of claim 1, wherein the operation prediction component is further configured to determine the expected set of operations to be performed on the portion of the database by identifying a data structure for data to be stored in the portion of the database.

4. The system of claim 1, wherein the characteristic of the expected set of operations comprises a ratio of read operations to write operations.

5. The system of claim 1, wherein the data format is a row-store format.

6. The system of claim 1, wherein the data format is a column-store format.

7. The system of claim 1, wherein the characteristic of the expected set of operations comprises a determination that sequential operations are likely to be performed on a first storage location and a second storage location nearby the first storage location.

8. The system of claim 1, wherein the characteristic of the expected set of operations comprises a ratio of write operations to read operations.

9. The system of claim 8, wherein the data format is a log-structured merge-tree format.

10. The system of claim 1, wherein the characteristic of the expected set of operations comprises a requirement to update less than all of the fields in a plurality of records stored in the database, and wherein the data format is a column-store format.

11. A method of performing operations in a computer database, comprising steps of:
    storing, by a plurality of storage engines, data in a database in a plurality of different data formats;
    receiving, by a storage API, requests from a client to perform operations on the database;
    determining an expected set of operations to be performed on a portion of the database;
    selecting, based on at least one characteristic of the expected set of operations, a data format of the plurality of data formats for storing data in the portion of the database, wherein the selected data format optimizes execution of the expected set of operations on the portion of the database relative to another one of the plurality of data formats;
    storing the selected data format in a configuration metadata component of the computer database;
    receiving, by the storage API, a request to perform a write operation;
    triggering, by the storage API, execution of at least one of the plurality of storage engines responsive to receiving a request to perform a write operation; and
    writing, by the at least one storage engine, data to the portion of the database in the selected data format.

12. The method of claim 11, wherein determining the expected set of operations to be performed on the portion of the database comprises:

accessing information about a past set of operations for a first time period; and predicting, based on the past set of operations for the first time period, an expected set of operations to be performed on the portion of the database during a second time period.

13. The method of claim 11, wherein determining the expected set of operations to be performed on the portion of the database comprises identifying a data structure for data to be stored in the portion of the database.

14. The method of claim 11, wherein the characteristic of the expected set of operations comprises a ratio of read operations to write operations.

15. The method of claim 14, wherein the first data format is a row-store format.

16. The method of claim 14, wherein the first data format is a column-store format.

17. The method of claim 11, wherein the characteristic of the expected set of operations comprises a determination that sequential operations are likely to be performed on a first storage location and a second storage location nearby the first storage location.

18. The method of claim 11, wherein the characteristic of the expected set of operations comprises high ratio of write operations to read operations.

19. The method of claim 18, wherein the second data format is a log-structured merge-tree format.

20. The method of claim 11, wherein the first characteristic of the expected set of operations is a requirement to update less than all of the fields in a plurality of records stored in the database, and wherein the first data format is a column-store format.

* * * * *